(12) United States Patent
Raghavan et al.

(10) Patent No.: US 6,626,789 B2
(45) Date of Patent: Sep. 30, 2003

(54) FAMILY OF SIX-SPEED TRANSMISSION MECHANISMS WITH THREE PLANETARY GEARSETS

(75) Inventors: Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/956,434

(22) Filed: Sep. 19, 2001

(65) Prior Publication Data

US 2003/0054915 A1 Mar. 20, 2003

(51) Int. Cl.$^7$ ................................................ F16H 3/66
(52) U.S. Cl. ...................................... 475/275; 475/280
(58) Field of Search ............................. 475/275, 276, 475/277, 278, 279, 280, 284

(56) References Cited

U.S. PATENT DOCUMENTS

| | | | |
|---|---|---|---|
| 4,038,888 A | * 8/1977 | Murakami et al. | 475/276 |
| 4,070,927 A | 1/1978 | Polak | 74/765 |
| 5,106,352 A | 4/1992 | Lepelletier | 475/280 |
| 5,599,251 A | 2/1997 | Beim et al. | 475/275 |
| 5,755,636 A | * 5/1998 | Justice et al. | 475/275 |
| 6,071,208 A | 6/2000 | Koivunun | 475/275 |
| 6,217,474 B1 | * 4/2001 | Ross et al. | 475/269 |

FOREIGN PATENT DOCUMENTS

| | | | |
|---|---|---|---|
| JP | 4-19449 A | * | 1/1992 |
| JP | 9-126283 | | 5/1997 |
| JP | 2000-274498 | * | 3/2000 |
| JP | 2000-240741 | * | 5/2000 |
| JP | 2001-182786 A | * | 7/2001 |

* cited by examiner

*Primary Examiner*—Ankur Parekh
(74) *Attorney, Agent, or Firm*—Cathryn A. Marra

(57) ABSTRACT

A family of multi-speed power transmissions included in powertrains having an engine and a final drive, wherein each transmission family member includes three planetary gearsets and five torque-transmitting mechanisms. The torque-transmitting mechanisms are engaged in combinations of two to establish a reverse drive ratio and six forward speed ratios between an input shaft and an output shaft. The torque-transmitting mechanisms include three rotating type torque-transmitting mechanisms and two stationary type torque-transmitting mechanisms. The three planetary gearsets include two continuously connected links between members of the first two planetary gearsets and one continuously connecting link between the second and third planetary gearsets. Each of the planetary gearsets may be either of the single pinion type or of the double pinion type of planetary gearset.

7 Claims, 11 Drawing Sheets

| | Ratios | 56 | 58 | 50 | 52 | 54 |
|---|---|---|---|---|---|---|
| Reverse | -5.02 | | X | X | | |
| Neutral | 0 | | X | | | |
| 1 | 5.24 | X | X | | | |
| 2 | 3.02 | X | | | X | |
| 3 | 1.96 | X | | | | X |
| 4 | 1.34 | X | | | X | |
| 5 | 1 | | | | X | X |
| 6 | 0.75 | | X | | X | |

(X=engaged clutch)

$\frac{\text{Ring Gear}}{\text{Sun Gear}}$ Toothratio : $\frac{R_1}{S_1}=2.98$, $\frac{R_2}{S_2}=1.88$, $\frac{R_3}{S_3}=1.67$

| Ratio Spread | 6.98 |
|---|---|
| Ratio Steps | |
| Rev/1 | -0.96 |
| 1/2 | 1.74 |
| 2/3 | 1.53 |
| 3/4 | 1.47 |
| 4/5 | 1.34 |
| 5/6 | 1.33 |

| | Ratios | 156 | 158 | 150 | 152 | 154 |
|---|---|---|---|---|---|---|
| Reverse | -4.31 | X | | X | | |
| Neutral | 0 | X | | | | |
| 1 | 5.84 | X | | | X | |
| 2 | 3.93 | X | X | | | |
| 3 | 2.69 | | X | | X | |
| 4 | 1.75 | | X | X | | |
| 5 | 1.35 | | X | | | X |
| 6 | 1 | | | X | | X |

(X=engaged clutch)

$\frac{\text{Ring Gear}}{\text{Sun Gear}}$ Toothratio : $\frac{R_1}{S_1}$ 1.87, $\frac{R_2}{S_2}$ =1.53, $\frac{R_3}{S_3}$ =2.93

| Ratio Spread | 5.84 |
|---|---|
| Ratio Steps | |
| Rev/1 | -0.74 |
| 1/2 | 1.49 |
| 2/3 | 1.46 |
| 3/4 | 1.53 |
| 4/5 | 1.3 |
| 5/6 | 1.35 |

| | Ratios | 256 | 258 | 250 | 252 | 254 |
|---|---|---|---|---|---|---|
| Reverse | -4.63 | | X | X | | |
| Neutral | 0 | | X | | | |
| 1 | 5.78 | | X | | X | |
| 2 | 3.93 | X | X | | | |
| 3 | 2.8 | X | | | X | |
| 4 | 1.85 | X | | X | | |
| 5 | 1.4 | X | | | | X |
| 6 | 1 | | | | X | X |

(X=engaged clutch)

$\frac{Ring\ Gear}{Sun\ Gear}$ Toothratio : $\frac{R_1}{S_1}$ 1.65, $\frac{R_2}{S_2}$ =1.59, $\frac{R_3}{S_3}$ =2.93

| Ratio Spread | 5.78 |
|---|---|
| Ratio Steps | |
| Rev/1 | -0.8 |
| 1/2 | 1.47 |
| 2/3 | 1.4 |
| 3/4 | 1.52 |
| 4/5 | 1.32 |
| 5/6 | 1.4 |

| | Ratios | 356 | 358 | 350 | 352 | 354 |
|---|---|---|---|---|---|---|
| Reverse | -3 | X | | | | X |
| Neutral | 0 | X | | | | |
| 1 | 5.58 | X | | | X | |
| 2 | 3.69 | X | X | | | |
| 3 | 2.6 | | X | | X | |
| 4 | 1.72 | | X | | | X |
| 5 | 1.38 | | X | X | | |
| 6 | 1 | | | X | X | |

(X=engaged clutch)

$\dfrac{\text{Ring Gear}}{\text{Sun Gear}}$ Toothratio : $\dfrac{R_1}{S_1}=3.0$, $\dfrac{R_2}{S_2}=1.69$, $\dfrac{R_3}{S_3}=2.63$

| Ratio Spread | 5.58 |
|---|---|
| Ratio Steps | |
| Rev/1 | -0.54 |
| 1/2 | 1.51 |
| 2/3 | 1.42 |
| 3/4 | 1.52 |
| 4/5 | 1.24 |
| 5/6 | 1.38 |

| | Ratios | 456 | 458 | 450 | 452 | 454 |
|---|---|---|---|---|---|---|
| Reverse | -3 | X | | | | X |
| Neutral | 0 | X | | | | |
| 1 | 3.41 | X | X | | | |
| 2 | 2.23 | X | | | X | |
| 3 | 1.31 | | X | | X | |
| 4 | 1 | | | | X | X |
| 5 | 0.77 | | X | | | X |
| 6 | 0.6 | | | X | X | |

(X=engaged clutch)

$\frac{Ring\ Gear}{Sun\ Gear}$ Toothratio : $\frac{R_1}{S_1}=3.0$, $\frac{R_2}{S_2}=1.88$, $\frac{R_3}{S_3}=1.53$

| Ratio Spread | 5.64 |
|---|---|
| Ratio Steps | |
| Rev/1 | -0.88 |
| 1/2 | 1.53 |
| 2/3 | 1.7 |
| 3/4 | 1.31 |
| 4/5 | 1.3 |
| 5/6 | 1.27 |

|  | Ratios | 556 | 558 | 550 | 552 | 554 |
|---|---|---|---|---|---|---|
| Reverse | -3 | X |  |  | X |  |
| Neutral | 0 | X |  |  |  |  |
| 1 | 3.41 | X | X |  |  |  |
| 2 | 2.23 | X |  | X |  |  |
| 3 | 1.31 |  | X | X |  |  |
| 4 | 1 |  |  | X | X |  |
| 5 | 0.77 |  | X |  | X |  |
| 6 | 0.6 |  | X |  |  | X |

(X=engaged clutch)

$\frac{Ring\ Gear}{Sun\ Gear}$ Toothratio : $\frac{R_1}{S_1} = 3.0,\ \frac{R_2}{S_2} = 1.88,\ \frac{R_3}{S_3} = 1.53$

| Ratio Spread | 5.64 |
|---|---|
| Ratio Steps |  |
| Rev/1 | -0.88 |
| 1/2 | 1.53 |
| 2/3 | 1.7 |
| 3/4 | 1.31 |
| 4/5 | 1.3 |
| 5/6 | 1.27 |

| | Ratios | 656 | 658 | 650 | 652 | 654 |
|---|---|---|---|---|---|---|
| Reverse | -2.33 | X | | | X | |
| Neutral | 0 | X | | | | |
| 1 | 4.39 | X | | | | X |
| 2 | 2.66 | X | X | | | |
| 3 | 1.73 | X | | X | | |
| 4 | 1.22 | | X | X | | |
| 5 | 1 | | | X | X | |
| 6 | 0.76 | | X | | X | |

(X=engaged clutch)

$\frac{\text{Ring Gear}}{\text{Sun Gear}}$ Toothratio : $\frac{R_1}{S_1}=2.33$, $\frac{R_2}{S_2}=1.88$, $\frac{R_3}{S_3}=1.53$

| Ratio Spread | 5.81 |
|---|---|
| Ratio Steps | |
| Rev/1 | -0.53 |
| 1/2 | 1.65 |
| 2/3 | 1.53 |
| 3/4 | 1.42 |
| 4/5 | 1.22 |
| 5/6 | 1.32 |

|  | Ratios | 756 | 758 | 750 | 752 | 754 |
|---|---|---|---|---|---|---|
| Reverse | -3 | X |  |  |  | X |
| Neutral | 0 | X |  |  |  |  |
| 1 | 3.41 | X | X |  |  |  |
| 2 | 2.23 | X |  |  | X |  |
| 3 | 1.31 |  | X |  | X |  |
| 4 | 1 |  |  |  | X | X |
| 5 | 0.77 |  | X |  |  | X |
| 6 | 0.6 |  | X | X |  |  |

(X=engaged clutch)

$\frac{Ring\ Gear}{Sun\ Gear}$ Toothratio : $\frac{R_1}{S_1}=3.0,\quad \frac{R_2}{S_2}=1.88,\quad \frac{R_3}{S_3}=1.53$

| Ratio Spread | 5.64 |
|---|---|
| Ratio Steps |  |
| Rev/1 | -0.88 |
| 1/2 | 1.53 |
| 2/3 | 1.7 |
| 3/4 | 1.31 |
| 4/5 | 1.3 |
| 5/6 | 1.27 |

| | Ratios | 856 | 858 | 850 | 852 | 854 |
|---|---|---|---|---|---|---|
| Reverse | -3 | X | | | | X |
| Neutral | 0 | X | | | | |
| 1 | 5.58 | X | | | X | |
| 2 | 3.69 | X | X | | | |
| 3 | 2.6 | | X | | X | |
| 4 | 1.72 | | X | | | X |
| 5 | 1.38 | | X | X | | |
| 6 | 1 | | | X | X | |

(X=engaged clutch)

$\frac{\text{Ring Gear}}{\text{Sun Gear}}$ Toothratio : $\frac{R_1}{S_1}=3.0$, $\frac{R_2}{S_2}=2.69$, $\frac{R_3}{S_3}=2.63$

| Ratio Spread | 5.58 |
|---|---|
| Ratio Steps | |
| Rev/1 | -0.54 |
| 1/2 | 1.51 |
| 2/3 | 1.42 |
| 3/4 | 1.52 |
| 4/5 | 1.24 |
| 5/6 | 1.38 |

| | Ratios | 956 | 958 | 950 | 952 | 954 |
|---|---|---|---|---|---|---|
| Reverse | -4.89 | | X | | X | |
| Neutral | 0 | | X | | | |
| 1 | 5.86 | X | X | | | |
| 2 | 3.56 | X | | | X | |
| 3 | 2.25 | X | | | | X |
| 4 | 1.44 | X | | X | | |
| 5 | 1 | | | X | | X |
| 6 | 0.75 | | X | X | | |

(X=engaged clutch)

$\frac{\text{Ring Gear}}{\text{Sun Gear}}$ Toothratio : $\frac{R_1}{S_1}=2.30$, $\frac{R_2}{S_2}=1.88$, $\frac{R_3}{S_3}=2.60$

| Ratio Spread | 7.77 |
|---|---|
| Ratio Steps | |
| Rev/1 | -0.84 |
| 1/2 | 1.64 |
| 2/3 | 1.58 |
| 3/4 | 1.57 |
| 4/5 | 1.44 |
| 5/6 | 1.33 |

| | Ratios | 1056 | 1058 | 1050 | 1052 | 1054 |
|---|---|---|---|---|---|---|
| Reverse | -4.63 | | | X | X | |
| Neutral | 0 | | X | | | |
| 1 | 5.78 | | X | | X | |
| 2 | 3.93 | X | X | | | |
| 3 | 2.8 | X | | | X | |
| 4 | 1.85 | X | | X | | |
| 5 | 1.4 | X | | | | X |
| 6 | 1 | | | X | | X |

(X=engaged clutch)

$\frac{\text{Ring Gear}}{\text{Sun Gear}}$ Toothratio : $\frac{R_1}{S_1} = 2.65$, $\frac{R_2}{S_2} = 1.59$, $\frac{R_3}{S_3} = 2.93$

| Ratio Spread | 5.78 |
|---|---|
| Ratio Steps | |
| Rev/1 | -0.8 |
| 1/2 | 1.47 |
| 2/3 | 1.4 |
| 3/4 | 1.52 |
| 4/5 | 1.32 |
| 5/6 | 1.4 |

FAMILY OF SIX-SPEED TRANSMISSION MECHANISMS WITH THREE PLANETARY GEARSETS

TECHNICAL FIELD

The present invention relates to planetary transmissions and, more particularly, to planetary transmissions having three planetary gearsets and five torque-transmitting mechanisms to establish at least six forward speed ratios and one reverse speed ratio.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier employs three planetary gearsets, three clutches and two brakes to provide six forward speed ratios and one reverse ratio. One of the planetary gearsets in Lepelletier is positioned and operated to establish two input members (unity and a reduction speed) for the remaining two planetary gearsets.

SUMMARY OF THE INVENTION

It is an object of the present invention to provide an improved family of six-speed transmissions having three planetary gearsets.

In one aspect of the present invention, the transmissions incorporate three planetary gearsets that are controlled by five selectively engageable torque-transmitting mechanisms to provide at least six forward speed ratios and one reverse speed ratio between an input shaft and an output shaft.

In another aspect of the present invention, each of the planetary gearsets has first, second, and third members.

In yet another aspect of the present invention, the first and second members of the first planetary gearset are continuously connected with respective first and second members of the second planetary gearset by respective interconnecting members.

In still another aspect of the present invention, the third member of the second planetary gearset is continuously connected with a first member of the third planetary gearset through a continuous connecting member.

In yet still another aspect of the present invention, the input shaft is continuously connected with one of the members of the planetary gearsets and the output shaft is continuously connected with another member of the planetary gearsets.

In a further aspect of the present invention, the five torque-transmitting mechanisms include three rotating type torque-transmitting mechanisms and two stationary type torque-transmitting mechanisms.

In a yet further aspect of the present invention, the first of the stationary torque-transmitting mechanisms selectively connects a member of the first or third planetary gearset with a stationary member, such as a transmission case.

In yet still a further aspect of the present invention, a second of the stationary torque-transmitting mechanisms selectively connects a member of the first, second or third planetary gearset, or one of the interconnecting members with a stationary transmission member.

In another aspect of the present invention, a first of the rotating type torque-transmitting mechanisms selectively connects a member of the first or second planetary gearset or one of the fixed interconnections with a member of the third planetary gearset.

In yet another aspect of the present invention, a second of the rotating torque-transmitting mechanisms selectively connects a member of the first or second planetary gearset or one of the interconnecting members with either the input shaft, the output shaft, or a member of the third planetary gearset.

In yet still another aspect of the present invention, a third of the rotating torque-transmitting mechanisms selectively interconnects a member of one of the planetary gearsets with either the input shaft, the output shaft, or another member of one of the planetary gearsets.

In a further aspect of the present invention, the five torque-transmitting mechanisms are selectively engageable in combinations of two to establish six at least forward speed ratios and one reverse speed ratio between the input shaft and the output shaft.

In yet still a further aspect of the present invention, each of the planetary gearsets includes a sun gear, a ring gear, and a planet carrier assembly member.

In a still further aspect of the present invention, the planet carrier assembly member can be of either the single pinion type, wherein one pinion gear meshes with both the ring gear and the sun gear, or a compound or double pinion type, wherein intermeshing pinion gears mounted on the planet carrier assembly mesh with the sun gear and ring gear, respectively.

DESCRIPTION OF EXEMPLARY EMBODIMENTS

Figures 1, 2:
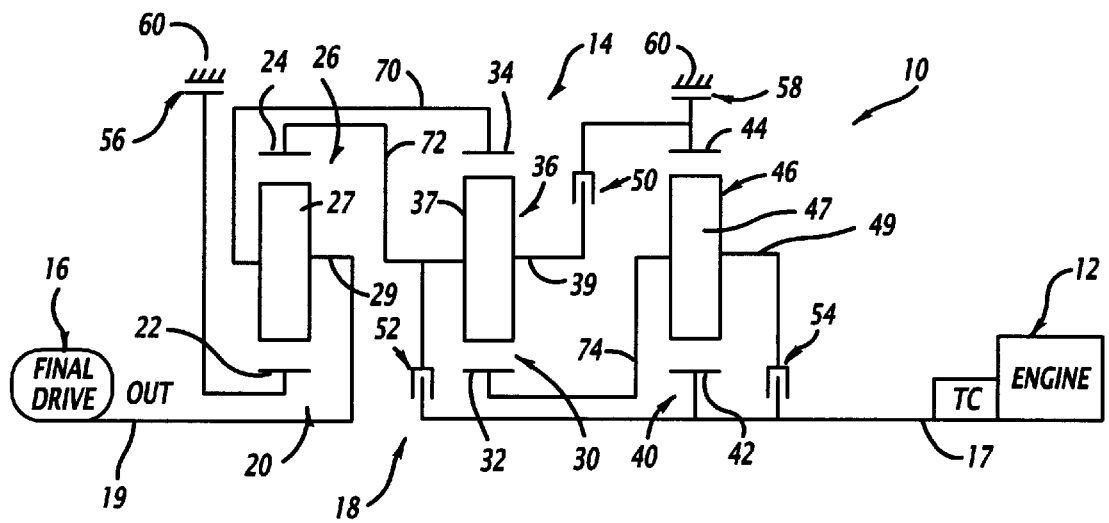
FIG. 1 is a schematic representation of one of the family members incorporated in a powertrain.
FIG. 2 is a truth table and chart depicting some of the operating characteristics of the transmission shown in FIG. 1.

Referring to the drawings, wherein like characters represent the same or corresponding parts throughout the several views, there is seen in FIG. 1 a powertrain 10 incorporating an engine and torque converter 12, a multi-speed planetary transmission 14, and a conventional output mechanism or final drive mechanism 16. The planetary transmission 14 includes an input shaft 17, a planetary gear arrangement 18, and an output shaft 19. The planetary gear arrangement 18 includes three planetary gearsets 20, 30, and 40.

The planetary gearset 20 includes a sun gear member 22, a ring gear member 24, and a planet carrier assembly member 26. The planet carrier assembly member 26 has a plurality of pinion gears 27 that are rotatably mounted on a carrier 29 and disposed in meshing relationship with the sun gear member 22 and the ring gear member 24.

The planetary gearset 30 includes a sun gear member 32, a ring gear member 34 and a planet carrier assembly member 36. The planet carrier assembly member 36 has a plurality of pinion gears 37 that are rotatably mounted on a carrier 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 has a plurality of pinion gears 47 rotatably mounted on a carrier 49 and disposed in meshing relationship with both the sun gear member 42 and the ring gear member 44.

The planetary gear arrangement 18 also includes five torque-transmitting mechanisms 50, 52, 54, 56 and 58. The torque-transmitting mechanisms 50, 52, and 54 are of the rotating type, commonly termed clutches, and torque-transmitting mechanisms 56 and 58 are of the stationary type, often termed brakes or stationary clutches. The torque-transmitting mechanisms 56 and 58 are connected with a stationary transmission component such as a housing 60.

The planetary gear arrangement 18 includes three interconnecting members 70, 72, and 74. The interconnecting member 70 continuously interconnects the planet carrier assembly member 26 and the ring gear member 34. The interconnecting member 72 continuously interconnects the ring gear member 24 and the planet carrier assembly member 36. The interconnecting member 74 continuously interconnects the sun gear member 32 and the planet carrier assembly member 46. The input shaft 17 is continuously connected between the engine and torque converter 12 and the sun gear member 42. The output shaft 19 is continuously connected with the planet carrier assembly member 26 and therefore the interconnecting member 70. The ring gear member 44 and sun gear member 22 are noncontinuously connected members of each of the respective planetary gearsets 40 and 20.

The input shaft 17 is selectively connectible with the interconnecting member 72 through the torque-transmitting mechanism 52 and with the interconnecting member 74 through the torque-transmitting mechanism 54. The ring gear member 44 is selectively interconnectible with the interconnecting member 72 through the torque-transmitting mechanism 50. The torque-transmitting mechanism 56 is selectively connectible between the housing 60 the sun gear member 22. The torque-transmitting mechanism 58 is selectively connectible between the housing 60 and the ring gear member 44.

As best seen in FIG. 2, the torque-transmitting mechanisms are selectively engageable in combinations of two to establish six forward speed ratios and one reverse speed ratio through the planetary gear arrangement 18 between the input shaft 17 and the output shaft 19.

To establish the reverse speed ratio, the torque-transmitting mechanisms 50 and 58 are engaged. With this combination of engagements, the ring gear member 44, planet carrier assembly member 36, and ring gear member 24 are held stationary. The planet carrier assembly member 46 and the sun gear member 32 are driven forwardly at a speed determined by the speed of the sun gear member 42 and the ring gear/sun gear tooth ratio of the planetary gearset 40. The ring gear member 34 and therefore output shaft 19 are driven in reverse at a speed determined by the speed of the sun gear member 32 and the ring gear/sun gear tooth ratio of the planetary gearset 30. The numerical value of the reverse speed ratio is determined by the ring gear/sun gear tooth ratios of the planetary gearsets 30 and 40.

The first forward speed ratio is established with the engagement of the torque-transmitting mechanisms 56 and 58. It should be noted that the torque-transmitting mechanism 58 can be maintained engaged through a neutral condition. This will simplify the forward/reverse interchange. With this engagement, the sun gear member 22 and ring gear member 44 are held stationary. The planet carrier assembly member 46 and the sun gear member 32 are driven forwardly at a speed determined by the speed of the sun gear member 42 and the ring gear/sun gear tooth ratio of the planetary gearset 40. The planet carrier assembly member 36 and the ring gear member 24 are driven at a speed determined by the speed of sun gear member 32, the speed of ring gear member 34, and the ring gear/sun gear tooth ratio of the planetary gearset 30. The planet carrier assembly member 26 and ring gear member 34 are driven forwardly at a reduced speed determined by the speed of the ring gear member 24 and the ring gear/sun gear tooth ratio of the planetary gearset 20. The numerical value of the first forward speed ratio is determined by all three planetary gearsets 20, 30, and 40.

The second forward speed ratio is established with the engagement of the torque-transmitting mechanisms 50 and 56. The torque-transmitting mechanism 50 interconnects the ring gear member 44 with the interconnecting member 72 and the torque-transmitting mechanism 56 holds the sun gear member 22 stationary. The planet carrier assembly member 46 is driven forwardly at a speed determined by the speed of the sun gear member 42, the speed of the ring gear member 44, and the ring gear/sun gear tooth ratio of the planetary gearset 40. The planet carrier assembly member 36 is driven forwardly at a speed determined by the speed of the sun gear member 32, the ring gear member 34, and the ring gear/sun gear tooth ratio of the planetary gearset 30. The planet carrier assembly member 26 and therefore the output shaft 19 is driven forwardly at a speed determined by the speed of the ring gear member 24 and the ring gear/sun gear tooth ratio of the planetary gearset 20. The numerical value of the second forward speed ratio is determined by the ring gear/sun gear tooth ratios of the planetary gearsets 20, 30, and 40.

The third forward speed ratio is established with the engagement of the torque-transmitting mechanisms 54 and 56. The 2/3 interchange is a single transition interchange. The torque-transmitting mechanism 54 connects the sun gear member 32 directly with the input shaft 17. The planet carrier assembly member 36 is driven forwardly at a speed determined by the speed of the sun gear member 32, the speed of the ring gear member 34, and the ring gear/sun gear tooth ratio of the planetary gearset 30. The planet carrier assembly member 26 and therefore output shaft 19 are driven forwardly at a speed determined by the speed of the ring gear member 24 and the ring gear/sun gear tooth ratio of the planetary gearset 20. The numerical value of the third forward speed ratio is determined by the ring gear/sun gear tooth ratios of the planetary gearsets 20 and 30.

The fourth forward speed ratio is established with the engagement of the torque-transmitting mechanisms 52 and 56. The torque-transmitting mechanism 52 provides a direct connection between the input shaft 17 and the interconnecting member 72 and therefore ring gear member 24. The planet carrier assembly member 26 and therefore the output shaft 19 is driven forwardly at a reduced speed determined by the speed of the ring gear member 24 and the ring gear/sun gear tooth ratio of the planetary gearset 20. The numerical value of the fourth forward speed ratio is determined by the ring gear/sun gear tooth ratio of the planetary gearset 20.

The fifth forward speed ratio is established with the engagement of the torque-transmitting mechanisms 52 and 54. When these torque-transmitting mechanisms are engaged, the planetary gearsets 30 and 20 rotate in unison such that the fifth forward speed ratio is a direct drive or 1:1 ratio.

The sixth forward speed ratio is established with the engagement of the torque-transmitting mechanisms 52 and 58. During the sixth forward speed ratio, the sun gear member 32 is driven forwardly at a reduced speed determined by the speed of the sun gear member 42 and the ring gear/sun gear tooth ratio of the planetary gearset 40. The ring gear member 34 and therefore output shaft 19 is driven forwardly at an increased speed determined by the speed of the planet carrier assembly member 26 (input), the speed of the sun gear member 32, and the ring gear/sun gear tooth ratio of the planetary gearset 30. The numerical value of the sixth forward speed ratio is determined by the ring gear/sun gear tooth ratios of the planetary gearsets 30 and 40.

The truth table and chart of FIG. 2 provides a depiction of the engagement sequence and combination of the torque-transmitting mechanisms. FIG. 2 also provides a numerical example of ratios that are available with the planetary transmission 14 when using the ring gear/sun gear tooth ratios given in FIG. 2. Also given in FIG. 2 is the ratio steps between adjacent forward ratios and between the reverse and first forward ratio, as well as the overall ratio spread of the forward speed ratios.

Figures 3, 4:
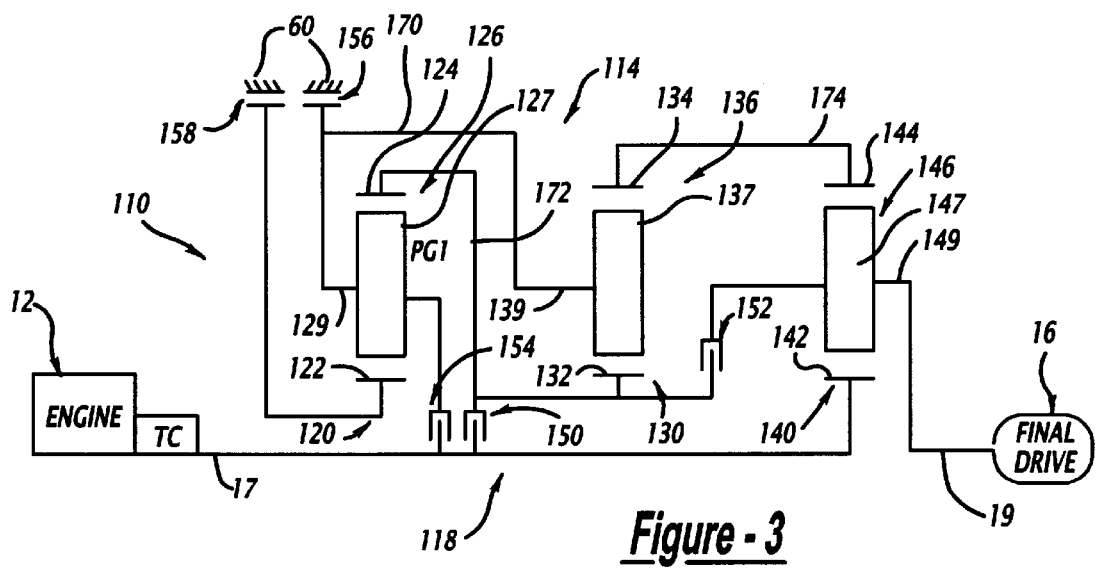
FIG. 3 is a schematic representation of another family member incorporated within a powertrain.
FIG. 4 is a truth table and chart depicting some of the operating characteristics of the transmission shown in FIG. 3.

A powertrain 110, shown in FIG. 3, includes the engine and torque converter 12, the multi-speed planetary transmission 114 and the conventional final drive mechanism 16. The planetary transmission 114 includes the input shaft 17, a planetary gear arrangement 118, and the output shaft 19. The planetary gear arrangement 118 includes three planetary gearsets 120, 130, and 140.

The planetary gearset 120 includes a sun gear member 122, a ring gear member 124, and a planet carrier assembly member 126. The planet carrier assembly member 126 has a plurality of pinion gears 127 that are rotatably mounted on a carrier 129 and disposed in meshing relationship with the sun gear member 122 and the ring gear member 124.

The planetary gearset 130 includes a sun gear member 132, a ring gear member 134 and a planet carrier assembly member 136. The planet carrier assembly member 136 has a plurality of pinion gears 137 that are rotatably mounted on a carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 has a plurality of pinion gears 147 rotatably mounted on a carrier 149 and disposed in meshing relationship with both the sun gear member 142 and the ring gear member 144.

The planetary gear arrangement 118 also includes five torque-transmitting mechanisms 150, 152, 154, 156 and 158. The torque-transmitting mechanisms 150, 152, and 154 are of the rotating type, commonly termed clutches, and torque-transmitting mechanisms 156 and 158 are of the stationary type, often termed brakes or stationary clutches. The torque-transmitting mechanisms 156 and 158 are connected with a stationary transmission component such as a housing 60.

The planet carrier assembly member 126 and the planet carrier assembly member 136 are continuously interconnected by an interconnecting member 170. The ring gear member 124 and sun gear member 132 are continuously interconnected by an interconnecting member 172. The ring gear members 134 and 144 are continuously interconnected by an interconnecting member 174. The input shaft 17 is continuously connected with the sun gear member 142 and the output shaft 19 is continuously connected with the planet carrier assembly member 146. Therefore, the planetary gearset 120 has one noncontinuously connected member 122.

The input shaft 17 is selectively connectible with the interconnecting member 170 through the torque-transmitting mechanism 154, and with the interconnecting member 172 through the torque-transmitting mechanism 150. The interconnecting member 172 is selectively connectible with the output shaft 19 and the planet carrier assembly member 146 through the torque-transmitting mechanism 152. The sun gear member 122 is selectively connectible with the housing 60 through the torque-transmitting mechanism 158 and the interconnecting member 170 is selectively connectible with the housing 60 through the torque-transmitting mechanism 156.

As shown by the truth table of FIG. 4, the torque-transmitting mechanisms are operated in combinations of two to establish six forward speed ratios and one reverse speed ratio between the input shaft 17 and the output shaft 19.

The reverse speed ratio is established with the engagement of the torque-transmitting mechanisms 150 and 156. During the reverse speed ratio, the ring gear members 134 and 144 are driven in reverse at a speed determined by the speed of the sun gear member 132 and the ring gear/sun gear tooth ratio of the planetary gearset 130. The planet carrier assembly member 146 and therefore output shaft 19 is driven in reverse at a speed determined by the speed of the ring gear member 144, the speed of the sun gear member 142, and the ring gear/sun gear tooth ratio of the planetary gearset 140. The numerical value of the reverse speed ratio is determined by the tooth values of the planetary gearsets 130 and 140.

The first forward speed ratio is established with the engagement of the torque-transmitting mechanisms 152 and 156. The torque-transmitting mechanism 156, as is evident from the truth table, can be maintained engaged through the neutral condition, thereby simplifying the forward/reverse shift. During the first forward speed ratio, the ring gear members 144 and 134 are driven in reverse at a speed determined by the speed of the sun gear member 142, the speed of the planet carrier assembly member 146, and the ring gear/sun gear tooth ratio of the planetary gearset 140. The sun gear member 132 and planet carrier assembly member 146 are driven forwardly at a speed determined by the speed of the ring gear member 134 and the ring gear/sun gear tooth ratio of the planetary gearset 130. The numerical value of the first forward speed ratio is determined by the ring gear/sun gear tooth ratios of the planetary gearsets 130 and 140.

The second forward speed ratio is established with the engagement of the torque-transmitting mechanisms 156 and 158. This combination of engagements effectively hold the ring gear member 144 stationary. During the second forward speed ratio, the planet carrier assembly member 146 and therefore output shaft 19 are rotated forwardly at a reduced speed determined by the speed of the sun gear member 142 and the ring gear/sun gear tooth ratio of the planetary gearset 140. The numerical value of the second forward speed ratio is determined by the ring gear/sun gear tooth ratio of the planetary gearset 140.

The third forward speed ratio is established with the engagement of the torque-transmitting mechanisms 152 and 158. The 2/3 interchange is a single transition interchange. During the third forward speed ratio, the ring gear members 134 and 144 are driven at a speed determined by the speed of the sun gear member 142, the speed of the planet carrier assembly member 146, and the ring gear/sun gear tooth ratio of the planetary gearset 140. The planet carrier assembly member 136 and planet carrier assembly member 126 are driven at a speed determined by the speed of the ring gear member 134, the speed of the sun gear member 132, and the ring gear/sun gear tooth ratio of the planetary gearset 130. The ring gear member 124, sun gear member 132, and planet carrier assembly member 146 and therefore output shaft 19 are driven forwardly at a reduced speed determined by the speed of the planet carrier assembly member 126 and the ring gear/sun gear tooth ratio of the planetary gearset 120. The overall numerical value of the third forward speed ratio is determined by the ring gear/sun gear tooth ratios of all three planetary gearsets 120, 130, and 140.

The fourth forward speed ratio is established with the engagement of the torque-transmitting mechanisms 150 and 158. The 3/4 interchange is a single transition interchange. During the fourth forward speed ratio, the planet carrier assembly member 126 and planet carrier assembly member 136 are driven forwardly at a speed determined by the speed of the ring gear member 124 and the ring gear/sun gear tooth ratio of the planetary gearset 120. The ring gear member 134 and ring gear member 144 are driven forwardly at a speed determined by the speed of the planet carrier assembly member 136, the speed of the sun gear member 132, and the ring gear/sun gear tooth ratio of the planetary gearset 130. The planet carrier assembly member 146 and therefore output shaft 19 are driven forwardly at a reduced speed determined by the speed of the sun gear member 142, the speed of the ring gear member 144, and the ring gear/sun gear tooth ratio of the planetary gearset 140. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 158 and 154. The 4/5 interchange is a single transition interchange. During the fifth forward speed ratio, the ring gear member 124 is driven forwardly at a speed determined by the speed of the planet carrier assembly member 126 and the ring gear/sun gear tooth ratio of the planetary gearset 120. The ring gear members 134 and 144 are driven forwardly at a speed determined by the speed of the sun gear member 132, the speed of the planet carrier assembly member 136, and the ring gear/sun gear tooth ratio of the planetary gearset 130. The planet carrier assembly member 146 and therefore output shaft 19 are driven forwardly at a speed determined by the speed of the sun gear member 142, the speed of the ring gear member 144, and the ring gear/sun gear tooth ratio of the planetary gearset 140. The numerical value of the fifth forward speed ratio is determined by the tooth values of all three planetary gearsets 120, 130, and 140.

The sixth forward speed ratio is established with the engagement of the torque-transmitting mechanisms 150 and 154. With the engagement of these two torque-transmitting mechanisms, the planetary gearsets 120, 130, and 140 are interconnected so as to rotate in unison with the input shaft 17 and the output shaft 19. Therefore, the ratio of the sixth forward speed ratio is a direct drive or 1:1 ratio.

As seen in FIG. 4, the torque-transmitting mechanisms are engaged in combinations of two to provide the above described six forward speeds and one reverse speed. It should be noted that each of the forward single step interchanges are single transition interchanges as are each of the double step interchanges. FIG. 4 also provides a sample of the numerical values for the drive ratios or speed ratios for the planetary transmission. FIG. 4 also provides an example of the ring gear/sun gear tooth ratios that are utilized in determining these ratios and also provides an example of the ratio steps between adjacent forward speed ratios and between the reverse and first forward speed ratio as well as the overall ratio spread of the forward drive ratios.

Figures 5, 6:
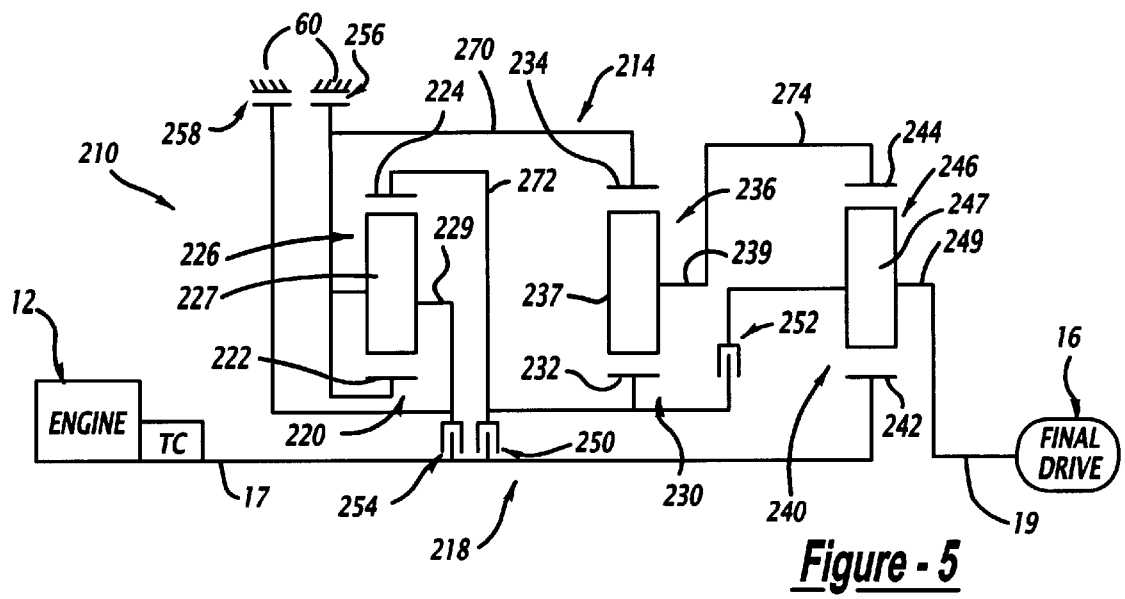
FIG. 5 is a schematic representation of another family member incorporated within a powertrain.
FIG. 6 is a truth table and chart depicting some of the operating characteristics of the transmission shown in FIG. 5.

A powertrain 210, shown in FIG. 5, includes the engine and torque converter 12, a multi-speed planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240.

The planetary gearset 220 includes a sun gear member 222, a ring gear member 224, and a planet carrier assembly member 226. The planet carrier assembly member 226 has a plurality of pinion gears 227 that are rotatably mounted on a carrier 229 and disposed in meshing relationship with the sun gear member 222 and the ring gear member 224.

The planetary gearset 230 includes a sun gear member 232, a ring gear member 234 and a planet carrier assembly member 236. The planet carrier assembly member 236 has a plurality of pinion gears 237 that are rotatably mounted on a carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 has a plurality of pinion gears 247 rotatably mounted on a carrier 249 and disposed in meshing relationship with both the sun gear member 242 and the ring gear member 244.

The planetary gear arrangement 218 also includes five torque-transmitting mechanisms 250, 252, 254, 256 and 258. The torque-transmitting mechanisms 250, 252, and 254 are of the rotating type, commonly termed clutches, and torque-transmitting mechanisms 256 and 258 are of the stationary type, often termed brakes or stationary clutches. The torque-transmitting mechanisms 256 and 258 are connected with a stationary transmission component such as a housing 60.

The sun gear member 222 and ring gear member 234 are continuously interconnected by an interconnecting member 270. The ring gear member 224 and the sun gear member 232 are continuously interconnected by an interconnecting member 272. The planet carrier assembly member 236 and ring gear member 244 are continuously connected with an interconnecting member 274. The input shaft 17 is continuously connected with the sun gear member 242 and selectively connectible with the planet carrier assembly member 226 through the torque-transmitting mechanism 254 and selectively connectible with the interconnecting member 272 through the torque-transmitting mechanism 250. The output shaft 19 is continuously drivingly connected with the planet carrier assembly member 246 and selectively connectible with the interconnecting member 272 through the torque-transmitting mechanism 252. The planet carrier assembly member 226 is selectively connectible with the housing 60 through the torque-transmitting mechanism 258. The interconnecting member 270 is selectively connectible with the housing 60 through the torque-transmitting mechanism 256.

As seen in FIG. 6, the torque-transmitting mechanisms are selectively engageable in combinations of two to provide six forward speed ratios and one reverse speed ratio between the input shaft 17 and the output shaft 19.

The reverse speed ratio is established with the engagement of the torque-transmitting mechanisms 250 and 258. During the reverse speed ratio, the sun gear member 222 and ring gear member 234 are driven in reverse at a speed determined by the speed of the ring gear member 224 and the ring gear/sun gear tooth ratio of the planetary gearset 220. The planet carrier assembly member 236 and ring gear member 244 are driven in reverse at a speed determined by the speed of the sun gear member 232, the speed of the ring gear member 234, and the ring gear/sun gear tooth ratio of the planetary gearset 230. The planet carrier assembly member 246 and therefore output shaft 19 is driven in reverse at a speed determined by the speed of the sun gear member 242, the speed of the ring gear member 244, and the ring gear/sun gear tooth ratio of the planetary gearset 240. The numerical value of the reverse speed ratio is determined by all three planetary gearsets 220, 230, and 240.

The first forward speed ratio is established with the engagement of the torque-transmitting mechanisms 252 and 258. The torque-transmitting mechanism 258 can remain engaged through the neutral condition to simplify the forward/reverse interchange. During the first forward speed ratio, the ring gear member 244 and planet carrier assembly member 236 are driven at a speed determined by the speed of the sun gear member 242, the speed of the planet carrier assembly member 246, and the ring gear/sun gear tooth ratio of the planetary gearset 240. The ring gear member 234 and sun gear member 222 are driven at a speed determined by the speed of the planet carrier assembly member 236, the speed of the sun gear member 232, and the ring gear/sun gear tooth ratio of planetary gearset 230. The ring gear member 224, sun gear member 232, planet carrier assembly member 246 and therefore output shaft 19 are driven forwardly at a reduced speed determined by the speed of the sun gear member 222 and the ring gear/sun gear tooth ratio of the planetary gearset 220. The overall numerical value of the first forward speed ratio is determined by the ring gear/sun gear tooth ratios of the planetary gearsets 220, 230, and 240.

The second forward speed ratio is established with the engagement of the torque-transmitting mechanisms 256 and 258. The engagement of these two torque-transmitting mechanisms effectively hold the ring gear member 244 stationary. The planet carrier assembly member 246 and therefore output shaft 19 are driven forwardly at a reduced speed determined by the speed of the sun gear member 242 and the ring gear/sun gear tooth ratio of the planetary gearset 240. The numerical value of the second forward speed ratio is determined by the ring gear/sun gear tooth ratio of the planetary gearset 240.

The third forward speed ratio is established with the engagement of the torque-transmitting mechanisms 252 and 256. During the third forward speed ratio, the ring gear member 244 and planet carrier assembly member 236 are driven at a speed determined by the speed of the sun gear member 242, the speed of the planet carrier assembly member 246, and the ring gear/sun gear tooth ratio of the planetary gearset 240. The sun gear member 232, planet carrier assembly member 246 and therefore output shaft 19 are driven forwardly at a reduced speed determined by the speed of the planet carrier assembly member 236 and the ring gear/sun gear tooth ratio of the planetary gearset 230. The numerical value of the third forward speed ratio is determined by the ring gear/sun gear tooth ratios of the planetary gearsets 230 and 240.

The fourth forward speed ratio is established with the engagement of the torque-transmitting mechanisms 250 and 256. During the fourth forward speed ratio, the planet carrier assembly member 236 and ring gear member 244 are driven forwardly at a speed determined by the speed of the sun gear member 232 and the ring gear/sun gear tooth ratio of the planetary gearset 230. The planet carrier assembly member 246 and output shaft 19 are driven forwardly at a speed determined by the speed of the ring gear member 244, the speed of the sun gear member 242, and the ring gear/sun gear tooth ratio of the planetary gearset 240. The numerical value of the fourth forward speed ratio is determined by the ring gear/sun gear tooth ratios of the planetary gearsets 230 and 240.

The fifth forward speed ratio is established with the engagement of the torque-transmitting mechanisms 254 and 256. During the fifth forward speed ratio, the ring gear member 224 and the sun gear member 232 are driven forwardly at a speed determined by the speed of the planet carrier assembly member 226 and the ring gear/sun gear tooth ratio of the planetary gearset 220. The planet carrier assembly member 236 and ring gear member 244 are driven forwardly at a speed determined by the speed of the sun gear member 232 and the ring gear/sun gear tooth ratio of the planetary gearset 230. The planet carrier assembly member 246 and therefore output shaft 19 are driven forwardly at a speed determined by the speed of the sun gear member 242, the speed of the ring gear member 244, and the ring gear/sun gear tooth ratio of the planetary gearset 240. The numerical value of the fifth forward speed ratio is determined by the planetary gearsets 220, 230, and 240.

The sixth forward speed ratio is established with the engagement of the torque-transmitting mechanisms 250 and 254. The engagement of these two torque-transmitting mechanisms effectively causes the planetary gear arrangement 218 to operate as a single unit to rotate in unison with the input shaft 17 and the output shaft 19. Therefore, the numerical value of the sixth forward speed ratio is one.

The truth table and chart of FIG. 6 describe the engagement sequence and combinations for the torque-transmitting mechanisms 250, 252, 254, 256, and 258. It should be noted that each of the forward single step interchanges are single transition interchanges, and that each of the double step interchanges are also single transition interchanges. The chart in FIG. 6 provides an example of the ratio steps between adjacent forward speed ratios as well as the step between the reverse and first forward speed ratio. The numerical values for the ratios steps and for the speed ratios given in FIG. 6 are determined utilizing the sample ring gear/sun gear tooth ratios also given in FIG. 6.

Figures 7, 8:
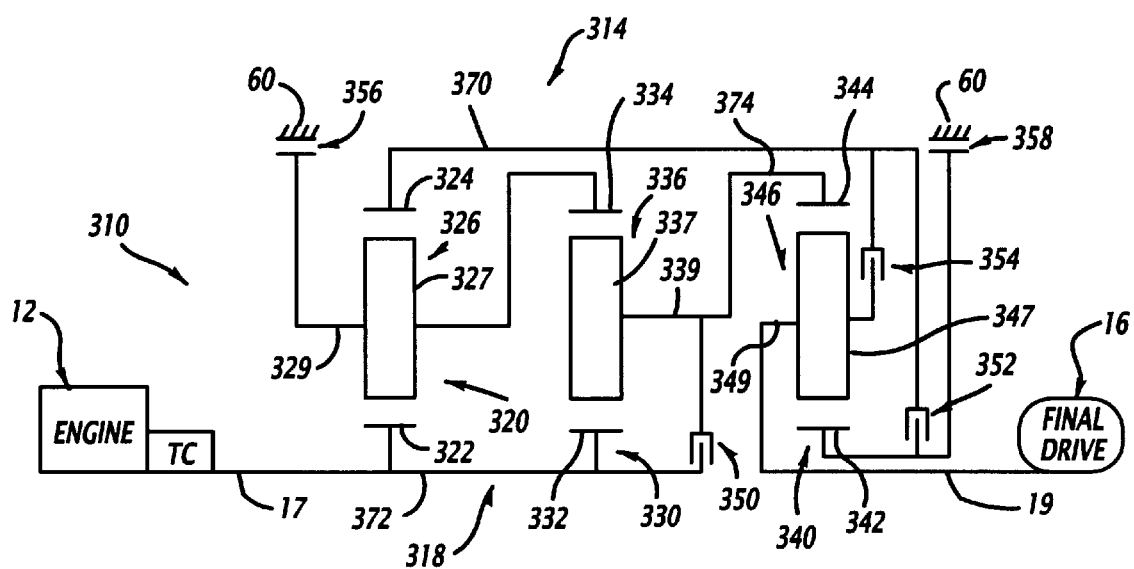
FIG. 7 is a schematic representation of another family member incorporated within a powertrain.
FIG. 8 is a truth table and chart depicting some of the operating characteristics of the transmission shown in FIG. 7.

A powertrain 310, shown in FIG. 7, includes the conventional engine and torque converter 12, a multi-speed planetary transmission 314, and the conventional final drive mechanism 16. The planetary transmission 314 includes the input shaft 17, the planetary gear arrangement 318, and the output shaft 19. The planetary gear arrangement 318 includes three planetary gearsets 320, 330, and 340.

The planetary gearset 320 includes a sun gear member 322, a ring gear member 324, and a planet carrier assembly member 326. The planet carrier assembly member 326 has a plurality of pinion gears 327 that are rotatably mounted on a carrier 329 and disposed in meshing relationship with the sun gear member 322 and the ring gear member 324.

The planetary gearset 330 includes a sun gear member 332, a ring gear member 334 and a planet carrier assembly member 336. The planet carrier assembly member 336 has a plurality of pinion gears 337 that are rotatably mounted on a carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 has a plurality of pinion gears 347 rotatably mounted on a carrier 349 and disposed in meshing relationship with both the sun gear member 342 and the ring gear member 344.

The planetary gear arrangement 318 also includes five torque-transmitting mechanisms 350, 352, 354, 356 and 358. The torque-transmitting mechanisms 350, 352, and 354 are of the rotating type, commonly termed clutches, and torque-transmitting mechanisms 356 and 358 are of the stationary type, often termed brakes or stationary clutches. The torque-transmitting mechanisms 356 and 358 are connected with a stationary transmission component such as a housing 60.

The planet carrier assembly member 326 and ring gear member 334 are continuously interconnected by an interconnecting member 370. The sun gear members 332 and 322 are continuously interconnected by an interconnecting member 372. The planet carrier assembly member 336 and the ring gear member 344 are continuously interconnected by an interconnecting member 374. The input shaft 17 is continuously connected with the interconnecting member 372 and selectively connectible with the interconnecting member 374 through the torque-transmitting mechanism 350. The output shaft 19 is continuously connected with the planet carrier assembly member 346 and selectively connectible with the ring gear member 324 through the torque-transmitting mechanism 354. The sun gear member 342 is selectively connectible with the ring gear member 324 through the torque-transmitting mechanism 352 and is also selectively connectible with the housing 60 through the torque-transmitting mechanism 358. The interconnecting member 370 is selectively connectible with the housing 60 through the torque-transmitting mechanism 356.

As seen in FIG. 8, the torque-transmitting mechanisms are engaged in combinations of two to provide six forward speed ratios and one reverse speed ratio. It is also noted in FIG. 8 that the torque-transmitting mechanism 356 can remain engaged through a neutral condition thereby simplifying the forward/reverse interchange.

To establish the reverse speed ratio, the torque-transmitting mechanisms 354 and 356 are engaged. During the reverse speed ratio, the ring gear member 324, planet carrier assembly member 346, and output shaft 19 are driven in reverse at a speed determined by the speed of the sun gear member 322 and the ring gear/sun gear tooth ratio of the planetary gearset 320. The numerical value of the reverse speed ratio is determined by the ring gear/sun gear tooth ratio of the planetary gearset 320.

The first forward speed ratio is established with the engagement of the torque-transmitting mechanisms 352 and 356. During the first forward speed ratio, the ring gear member 324 and sun gear member 342 are driven at a speed determined by the speed of the sun gear member 322 and the ring gear/sun gear tooth ratio of the planetary gearset 320. The planet carrier assembly member 336 and ring gear member 344 are driven at a speed determined by the speed of the sun gear member 332 and the ring gear/sun gear tooth ratio of the planetary gearset 330. The planet carrier assembly member 346 and output shaft 19 are driven forwardly at a speed determined by the speed of the sun gear member 342, the speed of the ring gear member 344, and the ring gear/sun gear tooth ratio of the planetary gearset 340. The numerical value of the first forward speed ratio is determined by the ring gear/sun gear tooth ratios of all three planetary gearsets 320, 330, and 340.

The second forward speed ratio is established with the engagement of the torque-transmitting mechanisms 356 and 358. During the second forward speed ratio, the planet carrier assembly member 336 and ring gear member 344 are driven forwardly at a speed determined by the speed of the sun gear member 332 and the ring gear/sun gear tooth ratio of the planetary gearset 330. The planet carrier assembly member 346 and output shaft 19 are driven forwardly at a speed determined by the speed of the ring gear member 344 and the ring gear/sun gear tooth ratio of the planetary gearset 340. The overall numerical value of the second forward speed ratio is determined by the ring gear/sun gear tooth ratios of the planetary gearsets 330 and 340.

The third forward speed ratio is established with the engagement of the torque-transmitting mechanisms 352 and 358. During the third forward speed ratio, the planet carrier assembly member 326 and ring gear member 334 are driven forwardly at a speed determined by the speed of sun gear member 322 and the ring gear/sun gear tooth ratio of the planetary gearset 320. The planet carrier assembly member 336 and ring gear member 344 are driven forwardly at a speed determined by the speed of the sun gear member 332, the speed of the ring gear member 334, and the ring gear/sun gear tooth ratio of the planetary gearset 330. The planet carrier assembly member 346 and output shaft 19 are driven forwardly at a speed determined by the speed of the ring gear member 344 and the ring gear/sun gear tooth ratio of the planetary gearset 340. The numerical value of the third forward speed ratio is determined by all three planetary gearsets 320, 330, and 340.

The fourth forward speed ratio is established with the engagement of the torque-transmitting mechanisms 354 and 358. During the fourth forward speed ratio the planet carrier assembly member 326 and ring gear member 334 are driven forwardly at a speed determined by the speed of the sun gear member 322, the speed of the ring gear member 324, and the ring gear/sun gear tooth ratio of the planetary gearset 320. The planet carrier assembly member 336 and ring gear member 344 are driven forwardly at a speed determined by the speed of the sun gear member 332 and the ring gear/sun gear tooth ratio of the planetary gearset 330. The planet carrier assembly member 346, the ring gear member 324, and the output shaft 19 are driven forwardly at a speed determined by the speed of sun gear member 342, the speed of the ring gear member 344, and the ring gear/sun gear tooth ratio of the planetary gearset 340. The numerical value of the fourth forward speed ratio is determined by all three planetary gearsets 320, 330, and 340.

The fifth forward speed ratio is established with the engagement of the torque-transmitting mechanisms 350 and 358. During the fifth forward speed ratio, the ring gear member 344 is driven at the input speed. The planet carrier assembly member 346 and output shaft 19 are driven forwardly at a reduced speed determined by the speed of the ring gear member 344 and the ring gear/sun gear tooth ratio of the planetary gearset 340. The numerical value of the fifth forward speed ratio is determined by the ring gear/sun gear tooth ratio of the planetary gearset 340.

The sixth forward speed ratio is established with the engagement of the torque-transmitting mechanisms 350 and 352. The engagement of these two torque-transmitting mechanisms effectively places the planetary gear arrangement 318 in a 1:1 condition such that all of the planetary gearsets rotate in unison with the input shaft 17 and the output shaft 19. Therefore, the numerical value of the sixth forward speed ratio is one.

The truth table and chart shown in FIG. 8 describe the engagement sequence of the torque-transmitting mechanisms utilized to provide the six forward speed ratios and the one reverse speed ratio. It should be noted from the truth table that each of the single step and double step forward interchanges are of the single transition type. FIG. 8 also provides an example of ring gear/sun gear tooth ratios that might be utilized with the planetary gearsets 320, 330, and 340 as represented by R1/S1, R2/S2, and R3/S3, respectively. FIG. 8 also provides an example of ratio steps between adjacent forward ratios as well as the ratio steps between the reverse and first forward speed ratio. The chart also provides an example of the overall ratio spread of the forward ratios.

Figures 9, 10:
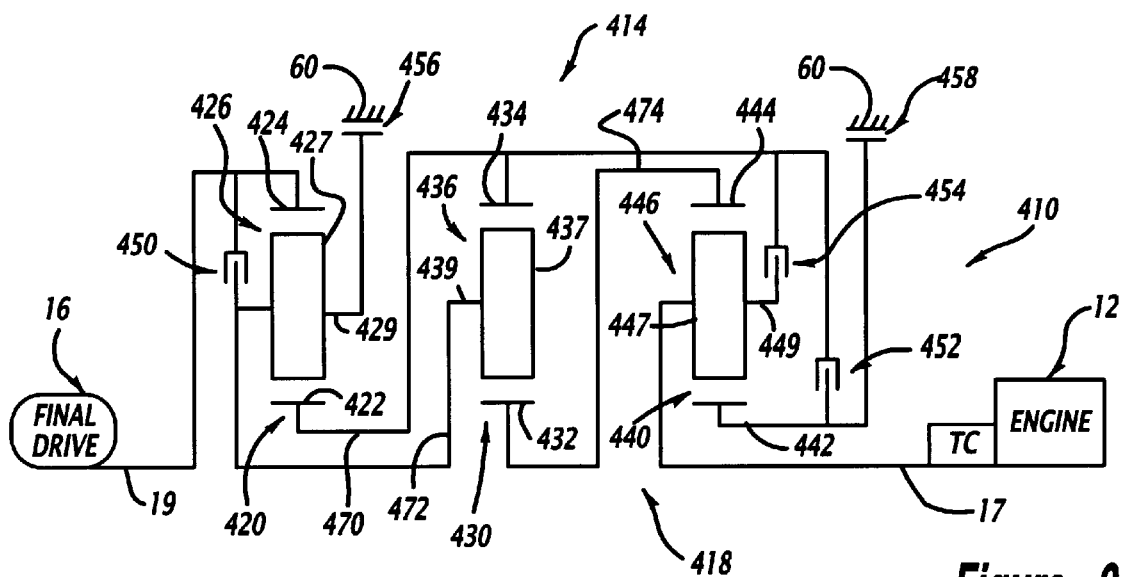
FIG. 9 is a schematic representation of another family member incorporated within a powertrain.
FIG. 10 is a truth table and chart depicting some of the operating characteristics of the transmission shown in FIG. 9.

A powertrain 410, shown in FIG. 9, includes the conventional engine and torque converter 12, a multi-speed planetary transmission 414, and the conventional final drive mechanism 16. The planetary transmission 414 includes the input shaft 17, a planetary gear arrangement 418, and the output shaft 19. The planetary gear arrangement 418 includes three planetary gearsets 420, 430, and 440.

The planetary gearset 420 includes a sun gear member 422, a ring gear member 424, and a planet carrier assembly member 426. The planet carrier assembly member 426 has a plurality of pinion gears 427 that are rotatably mounted on a carrier 429 and disposed in meshing relationship with the sun gear member 422 and the ring gear member 424.

The planetary gearset 430 includes a sun gear member 432, a ring gear member 434 and a planet carrier assembly member 436. The planet carrier assembly member 436 has a plurality of pinion gears 437 that are rotatably mounted on a carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 has a plurality of pinion gears 447 rotatably mounted on a carrier 449 and disposed in meshing relationship with both the sun gear member 442 and the ring gear member 444.

The planetary gear arrangement 418 also includes five torque-transmitting mechanisms 450, 452, 454, 456 and 458. The torque-transmitting mechanisms 450, 452, and 454 are of the rotating type, commonly termed clutches, and torque-transmitting mechanisms 456 and 458 are of the stationary type, often termed brakes or stationary clutches. The torque-transmitting mechanisms 456 and 458 are connected with a stationary transmission component such as a housing 60.

The sun gear member 422 and ring gear member 434 are continuously interconnected by an interconnecting member 470 which is selectively connectible with the planet carrier assembly member 446 and the input shaft 17 through the torque-transmitting mechanism 454, and is selectively connectible with the sun gear member 442 through the torque-transmitting mechanism 452. The planet carrier assembly member 426 is continuously connected with the planet carrier assembly member 436 through a continuously interconnecting member 472 that is selectively connectible with the ring gear member 424 and output shaft 19 through the torque-transmitting mechanism 450. The interconnecting member 472 is also selectively connectible with the housing 60 through the torque-transmitting mechanism 456. The sun gear member 432 and ring gear member 444 are continuously interconnected by an interconnecting member 474. The sun gear member 442 is selectively connectible with the housing 60 through the torque-transmitting mechanism 458.

The torque-transmitting mechanisms are engaged in combinations of two, as shown in FIG. 10, to establish six forward speed ratios and a reverse speed ratio between the input shaft 17 and the output shaft 19.

The reverse speed ratio is established with the engagement of the torque-transmitting mechanisms 454 and 456. During the reverse speed ratio, the sun gear member 422 is driven forwardly by the input shaft 17 through the torque-transmitting mechanism 454 and the planet carrier assembly member 426 is held stationary such that the ring gear member 424 and output shaft 19 rotate in reverse at a speed determined by the speed of the sun gear member 422 and the ring gear/sun gear tooth ratio of the planetary gearset 420. The numerical value of the reverse speed ratio is determined by the planetary gearset 420.

The first forward speed ratio is established with the engagement of the torque-transmitting mechanisms 456 and 458. During the first forward speed ratio, the ring gear member 444 and sun gear member 432 are driven forwardly at a speed determined by the speed of the planet carrier assembly member 446 and the ring gear/sun gear tooth ratio of the planetary gearset 440. The ring gear member 434 and sun gear member 422 are driven at a speed determined by the speed of the sun gear member 432 and the ring gear/sun gear tooth ratio of the planetary gearset 430. The ring gear member 424 and output shaft 19 are driven forwardly at a reduced speed determined by the speed of the sun gear member 422 and the ring gear/sun gear tooth ratio of the planetary gearset 420. The numerical value of the first forward speed ratio is determined by the ring gear/sun gear tooth ratios of all three planetary gearsets 420, 430, and 440.

The second forward speed ratio is established with the engagement of the torque-transmitting mechanisms 452 and 456. During the second forward speed ratio, the ring gear member 444 and sun gear member 432 are driven forwardly at a speed determined by the speed of the planet carrier assembly member 446, the speed of the sun gear member 442, and the ring gear/sun gear tooth ratio of the planetary gearset 440. The ring gear member 434, sun gear member 422, and sun gear member 442 are driven at a speed determined by the speed of the sun gear member 432 and the ring gear/sun gear tooth ratio of the planetary gearset 430. The ring gear member 424 and therefore output shaft 19 are driven forwardly at a speed determined by the speed of the sun gear member 422 and the ring gear/sun gear tooth ratio of the planetary gearset 420.

The third forward speed ratio is established with the engagement of the torque-transmitting mechanisms 452 and 458. During the third forward speed ratio, the ring gear member 444 and sun gear member 432 are driven forwardly at a speed determined by the speed of the planet carrier assembly member 446 and the ring gear/sun gear tooth ratio of the planetary gearset 440. The planet carrier assembly member 436 and planet carrier assembly member 426 are driven forwardly at a speed determined by the speed of the sun gear member 432 and the ring gear/sun gear tooth ratio of the planetary gearset 430. The ring gear member 424 and output shaft 19 are driven forwardly at a speed determined by the speed planet carrier assembly member 426 and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 452 and 454. This combination of torque-transmitting mechanisms establishes a 1:1 drive between the input shaft 17 and output shaft 19 as the planetary gear arrangement 418 rotates as a single unit. Therefore, the numerical value of the fourth forward speed ratio is one.

The fifth forward speed ratio is established with the engagement of the torque-transmitting mechanisms 454 and 458. During the fifth forward speed ratio, the ring gear member 444 and sun gear member 432 are driven forwardly at a speed determined by the speed of the planet carrier assembly member 456 and the ring gear/sun gear tooth ratio of the planetary gearset 440. The planet carrier assembly member 436 and planet carrier assembly member 426 are driven forwardly at a speed determined by the speed of the sun gear member 432, the speed of the ring gear member 434, and the ring gear/sun gear tooth ratio of the planetary gearset 430. The output shaft 19 is driven forwardly at an increased speed ratio determined by the speed of the planet carrier assembly member 426, the speed of the sun gear member 422, and the ring gear/sun gear tooth ratio of the planetary gearset 420. The numerical value of the fifth forward speed ratio is determined by all three planetary gearsets 420, 430, and 440.

The sixth forward speed ratio is established with the engagement of the torque-transmitting mechanisms 450 and 458. The engagement of the torque-transmitting mechanism 450 is effective to connect the ring gear member 444 directly with the output shaft 19. During the sixth forward speed ratio, the ring gear member 444 and therefore output shaft 19 are driven at a speed determined by the speed of the planet carrier assembly member 446 and the ring gear/sun gear tooth ratio of the planetary gearset 440. The numerical value of the sixth forward speed ratio is determined by the ring gear/sun gear tooth ratio of the planetary gearset 440.

The truth table and chart of FIG. 10 provide examples of the numerical values of the speed ratios for each of the forward speeds and the reverse speed. FIG. 10 also provides an example of the ring gear/sun gear tooth ratios that are utilized with the planetary gearsets 420, 430, and 440, as represented by the R1/S1, R2/S2, and R3/S3 values, respectively. Also given in FIG. 10 is an example of the ratio steps between adjacent forward speed ratios and also between the reverse and first forward speed ratio, as well as the overall ratio spread of the forward speed ratios.

Figures 11, 12:
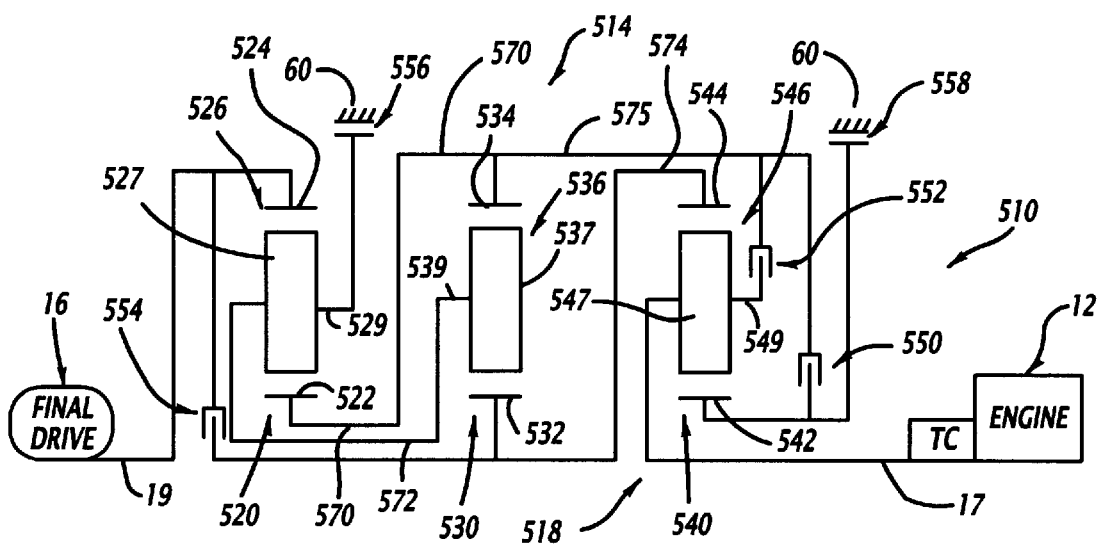
FIG. 11 is a schematic representation of another family member incorporated within a powertrain.
FIG. 12 is a truth table and chart depicting some of the operating characteristics of the transmission shown in FIG. 11.

A powertrain 510, shown in FIG. 11, includes the conventional engine and torque converter 12, a multi-speed planetary transmission 514, and the conventional final drive mechanism 16. The planetary transmission 514 includes the input shaft 17, a planetary gear arrangement 518, and the output shaft 19. The planetary gear arrangement 518 includes three planetary gearsets 520, 530, and 540.

The planetary gearset 520 includes a sun gear member 522, a ring gear member 524, and a planet carrier assembly member 526. The planet carrier assembly member 526 has a plurality of pinion gears 527 that are rotatably mounted on a carrier 529 and disposed in meshing relationship with the sun gear member 522 and the ring gear member 524.

The planetary gearset 530 includes a sun gear member 532, a ring gear member 534 and a planet carrier assembly member 536. The planet carrier assembly member 536 has a plurality of pinion gears 537 that are rotatably mounted on a carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 has a plurality of pinion gears 547 rotatably mounted on a carrier 549 and disposed in meshing relationship with both the sun gear member 542 and the ring gear member 544.

The planetary gear arrangement 518 also includes five torque-transmitting mechanisms 550, 552, 554, 556 and 558. The torque-transmitting mechanisms 550, 552, and 554 are of the rotating type, commonly termed clutches, and torque-transmitting mechanisms 556 and 558 are of the stationary type, often termed brakes or stationary clutches. The torque-transmitting mechanisms 556 and 558 are connected with a stationary transmission component such as a housing 60.

The sun gear member 522 and ring gear member 534 are continuously interconnected by an interconnecting member 570 that is selectively connectible with the input shaft 17 through the torque-transmitting mechanism 552 and is also selectively connectible with the sun gear member 542 through the torque-transmitting mechanism 550. The planet carrier assembly member 526 and planet carrier assembly member 536 are continuously interconnected by an interconnecting member 572. The sun gear member 532 and ring gear member 544 are continuously interconnected by an interconnecting member 574 that is also selectively connectible with the ring gear member 524 and the output shaft 19 through the torque transmitting mechanism 554. The ring gear member 524 is continuously connected with the output shaft 19. The interconnecting member 572 is selectively connectible with the housing 60 through the torque-transmitting mechanism 556. The sun gear member 542 is selectively connectible with the housing 60 through the torque-transmitting mechanism 558.

The truth table and chart shown in FIG. 12 depict the engagement combination and sequence of the torque-transmitting mechanisms to provide a reverse speed ratio and six forward speed ratios. The truth table of FIG. 12 also provides a numerical example of the speed ratios that are available with the planetary gear arrangement 518, shown in FIG. 11, when utilizing the example ring gear/sun gear tooth ratios R1/S1, R2/S2, and R3/S3 which are examples of the ring gear/sun gear tooth ratios that might be used with the planetary gearsets 520, 530, and 540, respectively. The chart of FIG. 12 provides an example of the ratio steps between adjacent forward speed ratios as well as between reverse and first forward speed ratio when utilizing the example ring gear/sun gear tooth ratios given above.

The truth table of FIG. 12 describes that each of the single step forward interchanges and double step forward interchanges are of the single transition variety. Those skilled in the art will recognize that the numerical value of the reverse speed ratio is determined by the ring gear/sun gear tooth ratio of the planetary gearset 520. The numerical values of the first forward speed ratio, the second forward speed ratio, the third forward speed ratio, and fifth forward speed ratio are determined by the ring gear/sun gear tooth ratios of all three planetary gearsets 520, 530, and 540. The numerical value of the fourth forward speed ratio is one, or a direct drive, and the numerical value of the sixth forward speed ratio is determined by the ring gear/sun gear tooth ratio of the planetary gearset 540.

Figures 13, 14:
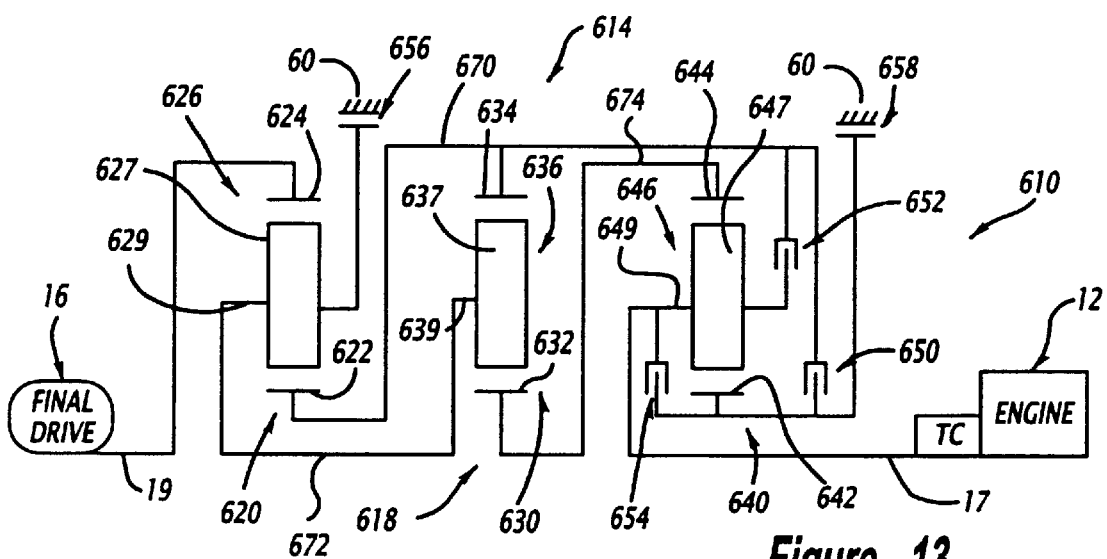
FIG. 13 is a schematic representation of another family member incorporated within a powertrain.
FIG. 14 is a truth table and chart depicting some of the operating characteristics of the transmission shown in FIG. 13.

A powertrain 610, shown in FIG. 13, includes the conventional engine and torque converter 12, a multi-speed planetary transmission 614, and the conventional final drive mechanism 16. The planetary transmission 614 includes the input shaft 17, a planetary gear arrangement 618, and the output shaft 19. The planetary gear arrangement 618 includes three planetary gearsets 620, 630, and 640.

The planetary gearset 620 includes a sun gear member 622, a ring gear member 624, and a planet carrier assembly member 626. The planet carrier assembly member 626 has a plurality of pinion gears 627 that are rotatably mounted on a carrier 629 and disposed in meshing relationship with the sun gear member 622 and the ring gear member 624.

The planetary gearset 630 includes a sun gear member 632, a ring gear member 634 and a planet carrier assembly member 636. The planet carrier assembly member 636 has a plurality of pinion gears 637 that are rotatably mounted on a carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 has a plurality of pinion gears 647 rotatably mounted on a carrier 649 and disposed in meshing relationship with both the sun gear member 642 and the ring gear member 644.

The planetary gear arrangement 618 also includes five torque-transmitting mechanisms 650, 652, 654, 656 and 658. The torque-transmitting mechanisms 650, 652, and 654 are of the rotating type, commonly termed clutches, and torque-transmitting mechanisms 656 and 658 are of the stationary type, often termed brakes or stationary clutches. The torque-transmitting mechanisms 656 and 658 are connected with a stationary transmission component such as a housing 60.

The truth table and chart found in FIG. 14 provide an explanation of the engagement sequence and combinations of the five torque-transmitting mechanisms that will establish six forward speed ratios and one reverse speed ratio between the input shaft 17 and the output shaft 19. FIG. 14 also provides an example of the ring gear/sun gear tooth ratios for the planetary gearsets 620, 630, and 640 represented as R1/S1, R2/S2, and R3/S3, respectively. FIG. 14 also gives an example of the ratio steps between adjacent forward speed ratios and the ratio step between the reverse and first forward speed ratio.

Those skilled in the art will recognize that the numerical value of the reverse speed ratio is determined by the ring gear/sun gear tooth ratio of the planetary gearset 620. The numerical value of the first forward speed ratio is established by the ring gear/sun gear tooth ratios of the planetary gearsets 620 and 630. The numerical values of the second forward speed ratio, the third forward speed ratio, the fourth forward speed ratio, and sixth forward speed ratio are determined by the ring gear/sun gear tooth ratios of all three planetary gearsets 620, 630, and 640. The fifth forward speed ratio is a direct drive, or 1:1 ratio.

Figures 15, 16:
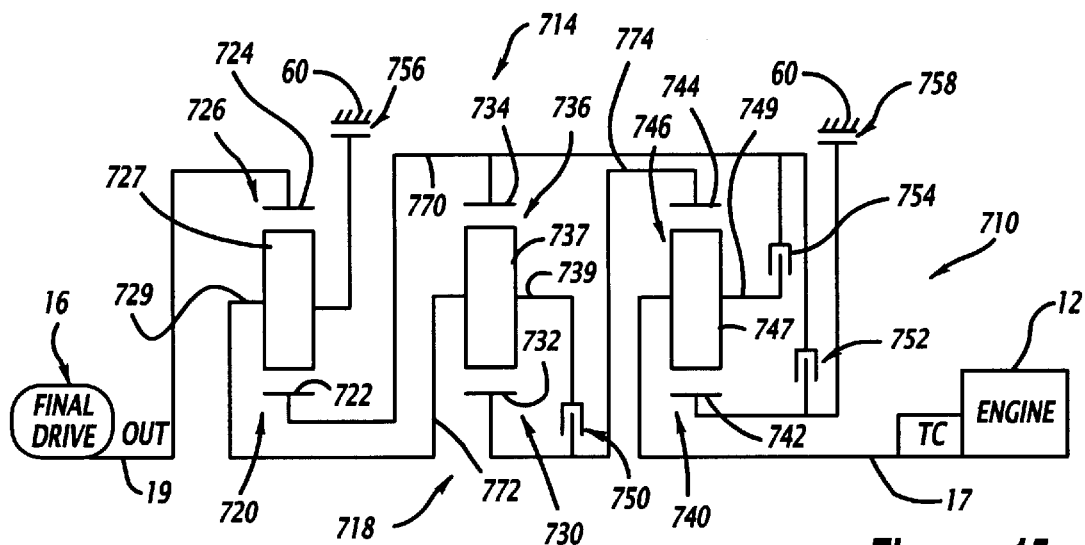
FIG. 15 is a schematic representation of another family member incorporated within a powertrain.
FIG. 16 is a truth table and chart depicting some of the operating characteristics of the transmission shown in FIG. 15.

A powertrain 710, shown in FIG. 15, includes the conventional engine and torque converter 12, a multi-speed planetary transmission 714, and the conventional final drive mechanism 16. The planetary transmission 714 includes the input shaft 17, a planetary gear arrangement 718, and the output shaft 19. The planetary gear arrangement 718 includes three planetary gearsets 720, 730, and 740.

The planetary gearset 720 includes a sun gear member 722, a ring gear member 724, and a planet carrier assembly member 726. The planet carrier assembly member 726 has a plurality of pinion gears 727 that are rotatably mounted on a carrier 729 and disposed in meshing relationship with the sun gear member 722 and the ring gear member 724.

The planetary gearset 730 includes a sun gear member 732, a ring gear member 734 and a planet carrier assembly member 736. The planet carrier assembly member 736 has a plurality of pinion gears 737 that are rotatably mounted on a carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 has a plurality of pinion gears 747 rotatably mounted on a carrier 749 and disposed in meshing relationship with both the sun gear member 742 and the ring gear member 744.

The planetary gear arrangement 718 also includes five torque-transmitting mechanisms 750, 752, 754, 756 and 758. The torque-transmitting mechanisms 750, 752, and 754 are of the rotating type, commonly termed clutches, and torque-transmitting mechanisms 756 and 758 are of the stationary type, often termed brakes or stationary clutches. The torque-transmitting mechanisms 756 and 758 are connected with a stationary transmission component such as a housing 60.

The truth table and chart of FIG. 16 provide a pictorial representation of the engagement combination and sequences for the five torque-transmitting mechanisms to provide six forward speed ratios and one reverse speed ratio between the input shaft 17 and the output shaft 19. The truth table also provides an example of the numerical values for the ratios provided with the planetary gear arrangement 718. These speed ratios are established utilizing the ring gear/sun gear tooth ratios of the planetary gearsets 720, 730, and 740, which are represented by the example, ring gear/sun gear tooth ratios R1/S1, R2/S2, and R3/S3, respectively, as given in FIG. 16. FIG. 16 also provides a numerical example of the ratio steps between adjacent forward speed ratios and the reverse/first forward speed ratio.

Those skilled in the art will recognize that each of the single step and double step forward interchanges, except the fourth to sixth interchange, are of the single transition variety. Also, it will be recognized that the numerical value of the reverse speed ratio is determined by the ring gear/sun gear tooth ratio of the planetary gearset 720. The numerical value of the first forward speed ratio, the second forward speed ratio, the third forward speed ratio, and fifth forward speed ratio are determined utilizing the ring gear/sun gear tooth ratios of all three planetary gearsets 720, 730, and 740. The fourth forward speed ratio is a direct drive, or 1:1 ratio, and the sixth forward speed ratio has a numerical value determined utilizing the ring gear/sun gear tooth ratio of the planetary gearset 740.

Figures 17, 18:
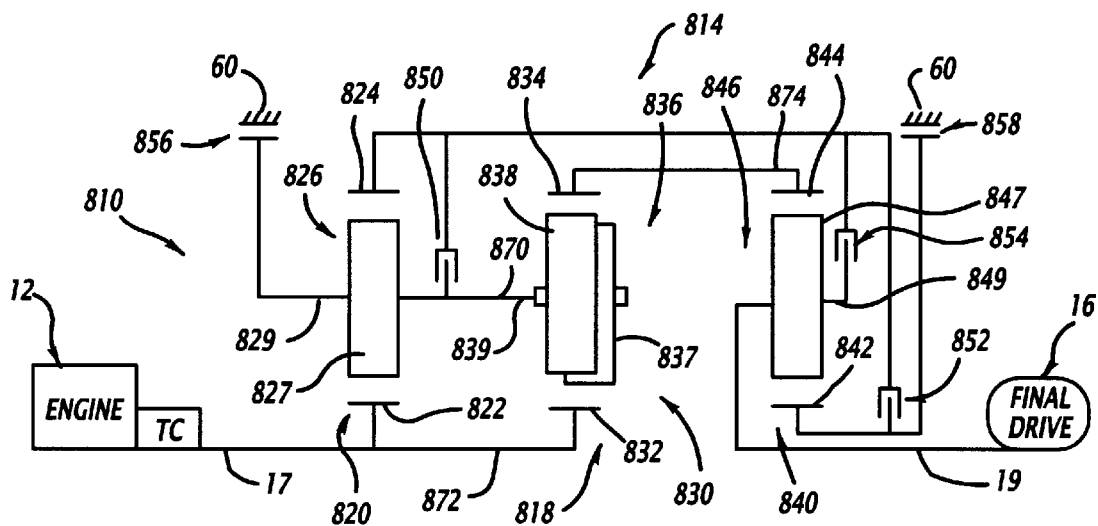
FIG. 17 is a schematic representation of another family member incorporated within a powertrain.
FIG. 18 is a truth table and chart depicting some of the operating characteristics of the transmission shown in FIG. 17.

A powertrain 810, shown in FIG. 17, includes the conventional engine and torque converter 12, a multi-speed planetary transmission 814, and the conventional final drive mechanism 16. The planetary transmission 814 includes the input shaft 17, a planetary gear arrangement 818, and the output shaft 19. The planetary gear arrangement 818 includes three planetary gearsets 820, 830, and 840.

The planetary gearset 820 includes a sun gear member 822, a ring gear member 824, and a planet carrier assembly member 826. The planet carrier assembly member 826 has a plurality of pinion gears 827 that are rotatably mounted on a carrier 829 and disposed in meshing relationship with the sun gear member 822 and the ring gear member 824.

The planetary gearset 830 includes a sun gear member 832, a ring gear member 834 and a planet carrier assembly member 836. The planet carrier assembly member 836 includes a plurality of intermeshing pinion gears 837 and 838 that are rotatably mounted on a carrier 839 and disposed in meshing relationship with both the sun gear member 832 and the ring gear member 834, respectively.

The planetary gearset 840 includes a sun gear member 842, a ring gear member 844, and a planet carrier assembly member 846. The planet carrier assembly member 846 has a plurality of pinion gears 847 rotatably mounted on a carrier 849 and disposed in meshing relationship with both the sun gear member 842 and the ring gear member 844.

The planetary gear arrangement 818 also includes five torque-transmitting mechanisms 850, 852, 854, 856 and 858. The torque-transmitting mechanisms 850, 852, and 854 are of the rotating type, commonly termed clutches, and torque-transmitting mechanisms 856 and 858 are of the stationary type, often termed brakes or stationary clutches. The torque-transmitting mechanisms 856 and 858 are connected with a stationary transmission component such as a housing 60.

The truth table and chart shown in FIG. 18 provide a pictorial representation of the combination of torque-transmitting mechanism engagements as well as the sequence of engagements that establish a reverse ratio and six forward speed ratios. It will be noted that these single ratio interchanges and double ratio interchanges, except the fourth to sixth, in the forward direction are single transition type shifts. The truth table also provides a numerical example for speed ratios that are available with the planetary gear arrangement 818. These speed ratios are determined utilizing the ring gear/sun gear tooth ratios of the planetary gearsets 820, 830, and 840 as represented by the values R1/S1, R2/S2, and R3/S3, respectively. Also provided in FIG. 18 is an example of the ratio steps between adjacent forward speed ratios as well as the reverse-to-first forward speed interchange.

Those skilled in the art will recognize that the numerical value of the reverse speed ratio is determined by the ring gear/sun gear tooth ratio of the planetary gearset 820. The numerical values of the first, third, and fourth forward speed ratios are determined by the ring gear/sun gear tooth ratios of all three planetary gearsets 820, 830, and 840. The numerical value of the second forward speed ratio is determined by the ring gear/sun gear tooth ratios of the planetary gearsets 830 and 840. The numerical value of the fifth forward speed ratio is determined utilizing the ring gear/sun gear tooth ratio of the planetary gearset 840. The sixth forward speed ratio is a direct drive, or 1:1 ratio.

Figures 19, 20:
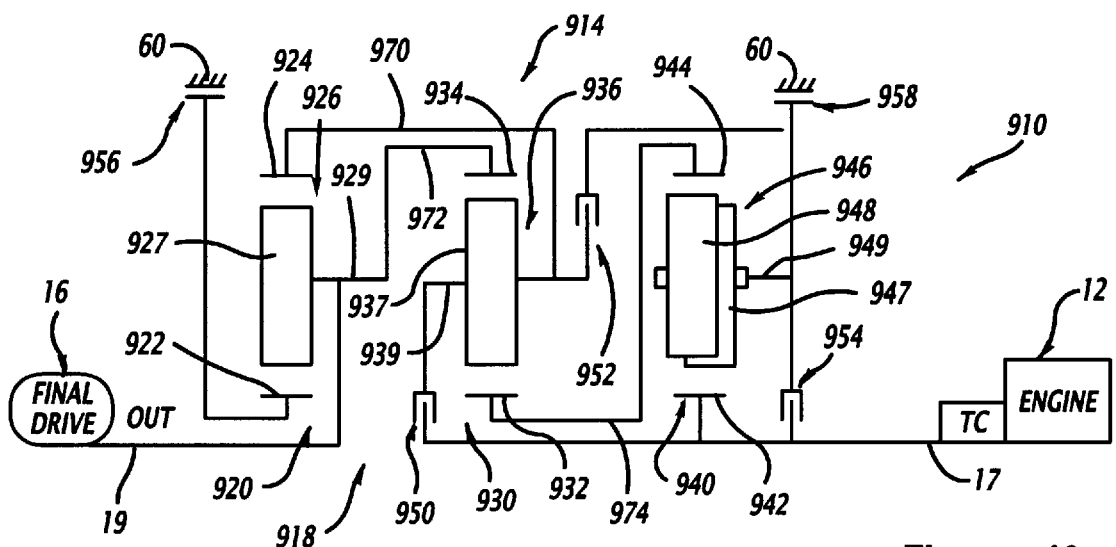
FIG. 19 is a schematic representation of another family member incorporated within a powertrain.
FIG. 20 is a truth table and chart depicting some of the operating characteristics of the transmission shown in FIG. 19.

A powertrain 910, shown in FIG. 19, includes the conventional engine and torque converter 12, a multi-speed planetary transmission 914, and the conventional final drive mechanism 16. The planetary transmission 914 includes a planetary gear arrangement 918, the input shaft 17, and the output shaft 19. The planetary gear arrangement 918 includes three planetary gearsets 920, 930, and 940.

The planetary gearset 920 includes a sun gear member 922, a ring gear member 924, and a planet carrier assembly member 926. The planet carrier assembly member 926 has a plurality of pinion gears 927 that are rotatably mounted on a carrier 929 and disposed in meshing relationship with the sun gear member 922 and the ring gear member 924.

The planetary gearset 930 includes a sun gear member 932, a ring gear member 934, and a planet carrier assembly member 936. The planet carrier assembly member 936 has a plurality of pinion gears 937 that are rotatably mounted on a carrier 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 has a plurality of intermeshing pinion gears 947 and 948 that are rotatably mounted on a planet carrier 949 and disposed in meshing relationship with the sun gear member 942 and ring gear member 944, respectively.

The planetary gear arrangement 918 also includes five torque-transmitting mechanisms 950, 952, 954, 956 and 958. The torque-transmitting mechanisms 950, 952, and 954 are of the rotating type, commonly termed clutches, and torque-transmitting mechanisms 956 and 958 are of the stationary type, often termed brakes or stationary clutches. The torque-transmitting mechanisms 956 and 958 are connected with a stationary transmission component such as a housing 60.

The ring gear member 924 and planet carrier assembly member 936 are continuously interconnected by an interconnecting member 970 that is selectively connectible with the planet carrier assembly member 946 through the torque-transmitting mechanism 952 and is selectively connectible with the input shaft 17 and sun gear member 942 through the torque-transmitting mechanism 950. The planet carrier assembly member 926 and ring gear member 934 are continuously interconnected by an interconnecting member 972 that is continuously connected with the output shaft 19. The input shaft 17 is selectively connectible with the planet carrier assembly member 946 through the torque-transmitting mechanism 954. The planet carrier assembly member 946 is selectively connectible with the housing 60 through the torque-transmitting mechanism 958. The sun gear member 922 is selectively connectible with the transmission housing 60 through the torque-transmitting mechanism 956.

The truth table and chart of FIG. 20 provide a pictorial representation of the engagement sequence and combinations for the torque-transmitting mechanisms 950, 952, 954, 956, and 958 that are utilized with the planetary gear arrangement 918 to establish a reverse drive ratio and six forward speed ratios between the input shaft 17 and the output shaft 19. The truth table of FIG. 20 also provides a numerical example for each of these ratios. These numerical values are determined utilizing the ring gear/sun gear tooth ratios for the planetary gearsets 920, 930, and 940, as represented by R1/S1, R2/S2, and R3/S3, respectively. Also given in FIG. 20 is an example of the step ratios that are present between the adjacent forward speed ratios when utilizing the numerical values given in the truth table.

Those skilled in the art will recognize that the numerical value of the reverse speed ratio is determined utilizing the ring gear/sun gear tooth ratios of the planetary gearsets 930 and 940. The first and second forward speed ratios have numerical values determined utilizing the ring gear/sun gear tooth ratios of all three planetary gearsets 920, 930, and 940. The third forward speed ratio has a numerical value determined utilizing the ring gear/sun gear tooth ratios of the planetary gearsets 920 and 930. The fourth forward speed ratio has a numerical value determined utilizing the ring gear/sun gear tooth ratio of the planetary gearset 920. The fifth forward speed ratio is a direct drive and therefore has a numerical value of one. The sixth forward speed ratio has a numerical value determined utilizing the ring gear/sun gear tooth ratios of the planetary gearsets 930 and 940.

Figures 21, 22:
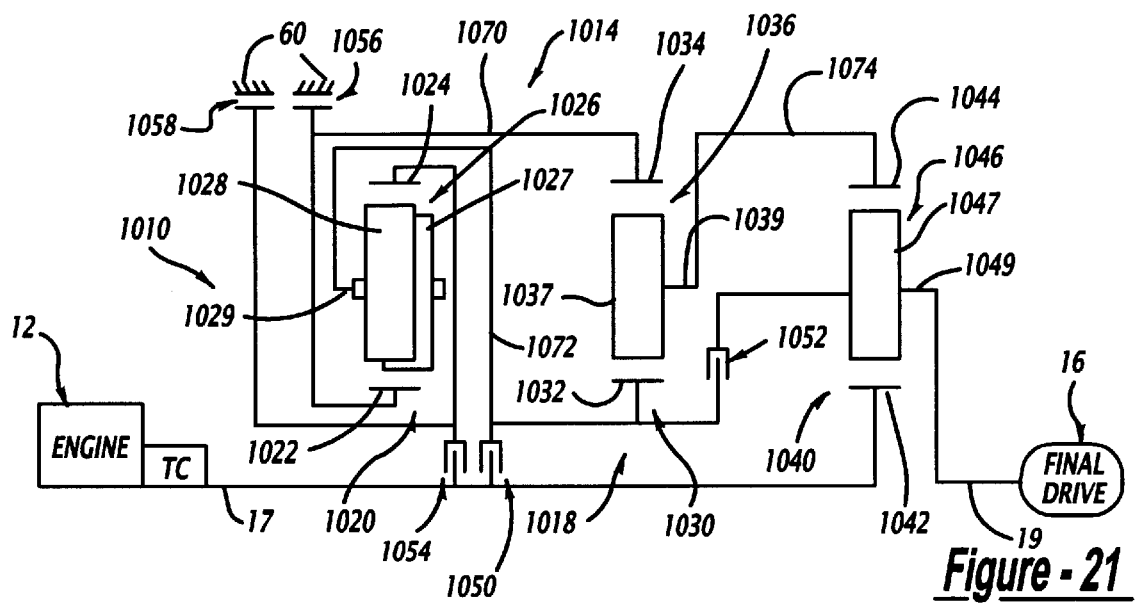
FIG. 21 is a schematic representation of another family member incorporated within a powertrain.
FIG. 22 is a truth table and chart depicting some of the operating characteristics of the transmission shown in FIG. 21.

A powertrain 1010, shown in FIG. 21, includes the conventional engine and torque converter 12, a multi-speed planetary transmission 1014, and the conventional final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040.

The planetary gearset 1020 includes a sun gear member 1022, a ring gear member 1024, and a planet carrier assembly member 1026. The planet carrier assembly member 1026 includes a plurality of intermeshing pinion gears 1027 and 1028 that are rotatably mounted on a carrier 1029 and disposed in meshing relationship with the sun gear member 1022 and the ring gear member 1024, respectively.

The planetary gearset 1030 includes a sun gear member 1032, a ring gear member 1034 and a planet carrier assembly member 1036. The planet carrier assembly member 1036 has a plurality of pinion gears 1037 that are rotatably mounted on a carrier 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 has a plurality of pinion gears 1047 rotatably mounted on a carrier 1049 and disposed in meshing relationship with both the sun gear member 1042 and the ring gear member 1044.

The planetary gear arrangement 1018 also includes five torque-transmitting mechanisms 1050, 1052, 1054, 1056 and 1058. The torque-transmitting mechanisms 1050, 1052, and 1054 are of the rotating type, commonly termed clutches, and torque-transmitting mechanisms 1056 and 1058 are of the stationary type, often termed brakes or stationary clutches. The torque-transmitting mechanisms 1056 and 1058 are connected with a stationary transmission component such as a housing 60.

The truth table and chart shown in FIG. 22 provide a pictorial representation of the sequence of engagements for the five torque-transmitting mechanisms, such that a reverse speed and six forward speed ratios are established between the input shaft 17 and the output shaft 19 through the planetary gear arrangement 1018. The truth table also provides an example of numerical values for each of the speed ratios. These numerical values are determined utilizing the ring gear/sun gear tooth ratios of the planetary gearsets 1020, 1030, and 1040 as represented by the values R1/S1, R2/S2, and R3/S3, respectively. As with all of the above powertrains, FIG. 22 also provides the example of ratio steps between adjacent forward speed ratios and between the reverse and first speed ratio when utilizing the numerical values of tooth ratios given.

Those skilled in the art will recognize that the numerical value of the reverse speed is determined utilizing the ring gear/sun gear tooth ratios of the planetary gearsets 1020, 1030, and 1040. The first forward speed ratio has a numerical value determined utilizing the ring gear/sun gear tooth ratios of all three planetary gearsets 1020, 1030, and 1040. The second forward speed ratio has a numerical value determined utilizing the ring gear/sun gear tooth ratio of the planetary gearset 1040. The third and fourth forward speed ratios have numerical values determined utilizing the ring gear/sun gear tooth ratios of the planetary gearsets 1030 and 1040. The fifth forward speed ratio has a numerical value determined utilizing the ring gear/sun gear tooth ratios of planetary gearsets 1020, 1030, and 1040. The sixth forward speed ratio is a direct drive having a numerical value of one.

From the above-described powertrains, it should now be evident to those having an understanding of the transmission art that each of the planetary gear arrangements incorporates three planetary gearsets. Each of these planetary gearsets has three members; namely, a sun gear member, a ring gear member, and a planet carrier assembly member. The first of the planetary gearsets has a first member connected with a first member of the second planetary gearset. These planetary gearsets also have second members continuously interconnected. The second and third planetary gearsets have members that are continuously interconnected. The input shaft 17 is continuously connected with at least one member of one of the planetary gearsets and the output shaft 19 is also continuously connected with at least one member of one of the planetary gearsets.

In all of the above arrangements, at least one member of one of the planetary gearsets is noncontinuously connected, and in many instances, two members are noncontinuously connected. For example, in FIG. 1 the sun gear member 22 is noncontinuously connected to any other member of the other planetary gearsets and the ring gear member 44 is noncontinuously connected to other members of the planetary gearsets. Each of these nonconnected members is selectively connectible with either the transmission housing or with another member of the planetary gearset. FIG. 3 has only one member that is noncontinuously connected, and that is the sun gear member 122. However, this member is selectively connectible with the housing 60 through the torque-transmitting mechanism 158.

The arrangement shown in FIG. 5 also has only one noncontinuously connected member; that is, the planet carrier assembly member 226. The arrangement shown in FIG. 7 has two noncontinuously connected members; namely, the ring gear member 324 and the sun gear member 342. The arrangement shown in FIG. 9 has one noncontinuously connected member; namely, sun gear member 442.

The family member shown in FIG. 11 has one noncontinuously connected member; namely, sun gear member 542. The family member shown in FIG. 13 has one noncontinuously connected member; namely, sun gear member 642. The family member shown in FIG. 15 has one noncontinuously connected member; namely, sun gear member 742. The family member shown in FIG. 17 has two noncontinuously connected members; namely, sun gear member 842 and ring gear member 824. The family member shown in FIG. 19 has two noncontinuously connected members; namely, planet carrier assembly member 946 and sun gear member 922. The family member shown in FIG. 21 has one noncontinuously connected member; namely, ring gear member 1024.

What is claimed is:

1. A transmission comprising:
   an input shaft;
   an output shaft;
   a stationary housing;
   first, second, and third planetary gearsets each comprising a first member, a second member, and a third member;
   a first interconnecting member continuously interconnecting said first member of said first planetary gearset with said first member of said second planetary gearset, a second interconnecting member continuously interconnecting said second member of said first planetary gearset with said second member of said second planetary gearset, a third interconnecting member continuously interconnecting said third member of said second planetary gearset with said first member of said third planetary gearset;
   said input shaft being continuously connected with at least one member of one of said planetary gearsets, and said output shaft being continuously connected to at least one member of said planetary gearsets that is not connected with said input shaft; and
   five selectively operable torque-transmitting mechanisms engageable in combinations of two to establish six forward speed ratios and one reverse speed ratio through said planetary gearsets between said input shaft and said output shaft wherein:
      a first of said torque-transmitting mechanisms is connectible between said second interconnecting member a said third member of said third planetary gearset, a second of said torque-transmitting mechanisms is connectible between said input shaft and said second interconnecting member, a third of said torque-transmitting mechanisms is connectible between said input shaft and said third interconnecting member, a fourth of said torque-transmitting mechanisms is connectible between said third member of said first planetary gearset and said stationary housing, and a fifth of said torque-transmitting mechanisms is connectible between said third member of said third planetary gearset and said stationary housing, or
      said first torque-transmitting mechanism is connected between said input shaft and said second interconnecting member, said second torque-transmitting mechanism is connectible between said output shaft and said second interconnecting member, said third torque-transmitting mechanism is connectible between said input shaft and said first interconnecting member, said fourth torque-transmitting mechanism is connectible between said first interconnecting member said stationary housing, and said fifth torque-transmitting mechanism is connectible between said third member of said first planetary gearset and said stationary housing, or
      said first torque-transmitting mechanism is connectible between said input shaft and said second interconnecting member, said second torque-transmitting mechanism is connectible between said output shaft and said second interconnecting member, said third torque-transmitting mechanism is connectible between said input shaft and said third member of said first planetary gearset, said fourth torque-transmitting mechanism is connectible between said first interconnecting member and said stationary housing, and said fifth torque-transmitting mechanism is connectible between said third member of said first lane gearset and said stationary housing, or
      said first torque-transmitting mechanism is connectible between said input shaft and said third interconnecting member, said second torque-transmitting mechanism is connectible between said third member of said first planetary gearset and said third member of said third planetary gearset, said third torque-transmitting mechanism is connectible between said output shaft and said third member of said first planetary gearset, said fourth torque-transmitting mechanism is connectible between said first interconnecting member and said stationary housing, and said fifth torque-transmitting mechanism is connectible between said third member of said third planetary gearset and said stationary housing, or said first torque-transmitting mechanism is connectible between said first interconnecting member and said third member of said third planetary gearset, said second torque-transmitting mechanism is connectible between said input shaft and said first interconnecting member, said third torque-transmitting mechanism is connectible between said output shaft and said third interconnecting member, said fourth torque-transmitting mechanism is connectible between said second interconnecting member and said stationary housing, and said fifth torque-transmitting mechanism is connectible between said third member of said third planetary gearset and said stationary housing, or said first torque-transmitting mechanism is connectible between said second interconnecting member and said output shaft, said second torque-transmitting mechanism is connectible between said first interconnecting member and said third member of said third planetary gearset, said third torque-transmitting mechanism is connectible between said input shaft and said first interconnect member, said fourth torque-transmitting mechanism is connectible between said second line connecting member and said stationary housing and said fifth torque-transmitting mechanism is connectible between said third member of said third planetary gearset and said stationary housing, or said first torque-transmitting mechanism is connectible between said first interconnecting member and said third member of said third planetary gearset, said second torque-transmitting mechanism is connectible between said input shaft and said first interconnecting member, said third torque-transmitting mechanism is connectible between said input shaft and said third member of said third planetary gearset, said fourth torque-transmitting mechanism is connectible between said second interconnecting member and said stationary housing, and said fifth torque-transmitting mechanism is connectible between said third member of said third planetary gearset and said stationary housing, or said first torque-transmitting mechanism is correctible between said second interconnecting member and said third interconnecting member, said second torque-transmitting mechanism is connectible between said first interconnecting member and said third member of said third planetary gearset, said third torque-transmitting mechanism is connectible between said input shaft and said first interconnecting member, said fourth torque-transmitting mechanism is connectible between said second interconnecting member and said stationary housing, and said fifth torque-transmitting mechanism is connectible between said third member of said third planetary gearset and said stationary housing, or said first torque-transmitting mechanism is connectible between said first interconnecting member and said third member of said first planetary gearset, said second torque-transmitting mechanism is connectible between said third member of said first planetary gearset and said third member of said third planetary gearset, said third torque-transmitting mechanism is connectible between said third member of said first planetary gearset and said output shaft, said fourth torque-transmitting mechanism is connectible between said first interconnecting member and said stationary housing, and said fifth torque-transmitting mechanism is connectible between said third member of said third planetary gearset and said stationary housing, or said first torque-transmitting mechanism is connectible between said input shaft and said first interconnecting member, and second torque-transmitting mechanism is connectible between said first interconnecting member and said third member of said third planetary gearset, said third torque-transmitting mechanism is connectible between said input shaft and said third member of said third planetary gearset, said fourth torque-transmitting mechanism is connectible between said third member of said first planetary gearset and said stationary housing, and said fifth torque-transmitting mechanism is connectible between said third member of said third planetary gearset and said stationary housing, or said first torque-transmitting mechanism is connectible between said input shaft and said second interconnecting member and said output shaft, said third torque-transmitting mechanism is connectible between said input shaft and said third member of said first planetary gearset, said fourth torque-transmitting mechanism is connectible between said first interconnecting member and said stationary housing, and said fifth torque-transmitting mechanism is connectible between said third member of said third planetary gearset and said stationary housing.

2. The transmission defined in claim 1 further wherein:

each of said members of each of said planetary gearsets is one of a sun gear member, a ring gear member, and planet carrier assembly member.

3. The transmission defined in claim 1 further wherein:

said first and second torque transmitting mechanisms are fluid operated selectively engageable friction brake mechanisms, and said third, said fourth, and said fifth torque transmitting mechanisms are fluid operated selectively engageable friction clutch mechanisms.

4. The transmission defined in claim 2 further wherein:

each of said planet carrier assembly members is comprised of a plurality of planet pinion gear members rotatably mounted on a carrier member and disposed in meshing relation with said sun gear member and said ring gear member.

5. The transmission defined in claim 2 further wherein:

at least one of said planet carrier assembly members has a plurality of pairs of intermeshing pinion gear members rotatably mounted on a carrier member and disposed in meshing relation with respective ones of said sun gear member and said ring gear member.

6. A multi-speed power transmission comprising:

an input shaft;

an output shaft;

a transmission housing;

a first planetary gearset having a first member, a second member, and a third member;

a second planetary gearset having a first member, a second member, and a third member;

a third planetary gearset having a first member, a second member, and a third member;

a first interconnecting member continuously interconnecting said first members of said first and said second planetary gearsets, a second interconnecting member continuously interconnecting said second members of said first and said second planetary gearsets, and a third interconnecting member continuously interconnecting said third member of said second planetary gearset and said first member of said third planetary gearset, at least one of said third members of said first and third planetary gearsets being non-continuously interconnected members;

said input shaft being continuously interconnected with one member of a group consisting of said second member of one of said planetary gearsets;

said output shaft being continuously interconnected with one member of a group consisting of said third member of one of said first and third planetary gearsets, said second member of said third planetary gearset, said first interconnecting member, and said second interconnecting member;

three rotating torque-transmitting mechanisms and two stationary torque-transmitting mechanisms, said torque-transmitting mechanisms being selectively engageable in combinations of two to establish at least six forward speed ratios and one reverse speed ratio through said planetary gearsets between said input shaft and said output shaft.

7. A multi-speed power transmission comprising:

an input shaft, an output shaft, and a transmission housing;

a first planetary gearset having first, second, and third members, a second planetary gearset having first, second, and third members, and a third planetary gearset having first, second, and third members;

a first interconnecting member continuously interconnecting said first member of said first planetary gearset with said first member of said second planetary gearset, a second interconnecting member continuously interconnecting said second member of said first planetary gearset with said second member of said second planetary gearset, a third interconnecting member continuously interconnecting said third member of said second planetary gearset with said first member of said third planetary gearset, said input shaft being continuously interconnected with at least one member of one of said planetary gearsets, and said output shaft being continuously interconnected with at least one other member of one of said planetary gearsets;

three rotating torque-transmitting mechanisms and two stationary torque-transmitting mechanisms, said torque-transmitting mechanisms being selectively engageable in combinations of two to establish at least six forward speed ratios and a reverse ratio between said input shaft and said output shaft wherein:

a first of said rotating torque-transmitting mechanisms is connectible between said second interconnecting member and said third member of said third planetary gearset, a second of said rotating torque-transmitting mechanisms is connectible between said input shaft and said second interconnecting member a third of said rotating torque-transmitting mechanisms is connectible between said input shaft and said third interconnecting member, a first of said stationary torque-transmitting mechanisms is connectible between said third member of said first planetary gearset and said stationary housing, and a second of said stationary torque-transmitting mechanisms is connectible between said third member of said third planetary gearset and said stationary housing, or said first of said rotating torque-transmitting mechanisms is connected between said input shaft and said second interconnecting member said second of said rotating torque-transmitting mechanisms is connectible between said output shaft and said second interconnecting member, said third said rotating torque-transmitting mechanisms is connectible between said input shaft and said first interconnecting member, said first of said stationary torque-transmitting mechanisms is connectible between said first interconnecting member and said stationary housing, said second of said stationary torque-transmitting mechanisms is connectible between said third member of said first planetary gearset and said stationary housing, or said first of said rotating torque-transmitting mechanisms is connectible between said input shaft and said second interconnecting member, said second of said rotating torque-transmitting mechanisms is connectible between said output shaft and said second interconnecting member, said third of said rotating torque-transmitting mechanisms is connectible between said input shaft and said third member of said first planetary gearset, said first of said stationery torque-transmitting mechanisms is connectible between said first interconnecting member and said stationary housing, and said second of said stationary torque-transmitting mechanisms is connectible between said third member of said first planetary gearset and said stationary housing, or said first of said rotating torque-transmitting mechanisms is connectible between said input shaft and said third interconnecting member said second of said rotating torque-transmitting mechanisms is connectible between said third member of said first planetary gearset and said third member of said third planetary gearset, said third of said rotating torque-transmitting mechanisms is connectible between said output shaft and said third member of said first planetary gearset, said first of said stationary torque-transmitting mechanisms is connectible between said first interconnecting member and said stationary housing, and said second of said stationary torque-transmitting mechanisms is connectible between said third member of said third planetary gearset and said stationary housing, or said first of said rotating torque-transmitting mechanisms is connectible between said first interconnecting member and said third member of said third planetary gearset, said second of said rotating for torque-transmitting mechanisms is connectible between said input shaft and said first interconnecting member, said third of said rotating torque-transmitting mechanisms is connectible between said output shaft and said third interconnecting member, said first of said stationary torque-transmitting mechanisms is connectible between said second interconnecting member and said stationary housing, and said second of said stationary torque-transmitting mechanisms is connectible between said third member of said third planetary gearset and said stationary housing, or said first of said rotating for torque-transmitting mechanisms is connectible between said second interconnecting member and said a output shaft, said second of said rotating torque-transmitting mechanisms is connectible between said first interconnecting member and said third member of said third planetary gearset, said third of said rotating for torque-transmitting mechanisms is connectible between said input shaft and said first interconnecting member, said first of said stationary torque-transmitting mechanisms is connectible between said second interconnecting member and said stationary housing, and said second of said stationary torque-transmitting mechanisms is connectible between said third member of said third planetary gearset and said stationary housing, or said first of said rotating torque-transmitting mechanisms is connectible between said first interconnecting member said third member of said third lane gearset, said second of said rotating torque-transmitting mechanisms is connectible between said input shaft and said first interconnecting member, said third of said rotating torque-transmitting mechanisms is connectible between said input shaft and said third member of said third planetary gearset, said first of said stationary torque-transmitting mechanisms is connectible between said second interconnecting member and said stationary housing, and said second of said stationary torque-transmitting mechanisms is connectible between said third member of said third planetary gearset and said stationary housing, or said first of said rotating torque-transmitting mechanisms is connectible between said second interconnecting member and said third interconnecting member, said second of said rotating torque-transmitting mechanisms is connectible between said first interconnecting member and said third member of said third planetary gearset, said third of said rotating torque-transmitting mechanisms is connectible between said input shaft and said first interconnecting member, said first of said stationary torque-transmitting mechanisms is connectible between said second interconnecting member and said stationary housing, and said second of said stationary torque-transmitting mechanisms is connectible between said third member of said third planetary gearset and said stationary housing, or said first of said rotating torque-transmitting mechanisms is connectible between said first interconnecting member a said third member of said first planetary gearset, said second of said rotating torque-transmitting mechanisms is connectible between said third member of said first planetary gearset and said third member of said third planetary gearset, said third of said rotating torque-transmitting mechanisms is connectible between said third member of said first planetary gearset and said output shaft, said first of said stationary torque-transmitting mechanisms is connectible between said first interconnecting member and said stationary housing, and said second of said torque-transmitting mechanisms is connectible between said third member of said third planetary gearset and said stationary housing, or said first of said rotating torque-transmitting mechanisms is connectible between said input shaft and said first interconnecting member, said second of said rotating torque-transmitting mechanisms is connectible between said first interconnecting member and said third member of said third planet gearset, said third of said rotating torque-transmitting mechanisms is connectible between said input shaft and said third member of said third planetary gearset, said first of said stationary torque-transmitting mechanisms is connectible between said third member of said first planetary gearset and said stationary housing, and said second of said stationary torque-transmitting mechanisms is connectible between said third member of said third planetary gearset and said stationary housing, or said first of said rotating torque-transmitting mechanisms is connectible between said input shaft and said second interconnecting member, said second of said rotating torque-transmitting mechanisms is connectible between said second interconnecting member and said output shaft, said third of said rotating torque-transmitting mechanisms is connectible between said input shaft and said third member of said first planetary gearset, said first of said stationary torque-transmitting mechanisms is connectible between said first interconnecting member and said stationary housing, and said second of said torque-transmitting mechanisms is connectible between said third member of said third planetary gearset and said stationary housing.

* * * * *